US012626414B2

(12) United States Patent
Taquet et al.

(10) Patent No.: US 12,626,414 B2
(45) Date of Patent: May 12, 2026

(54) METHOD AND APPARATUS OF ENCODING/DECODING POINT CLOUD GEOMETRY DATA CAPTURED BY A SPINNING SENSORS HEAD

(71) Applicant: Beijing Xiaomi Mobile Software Co., Ltd., Beijing (CN)

(72) Inventors: Jonathan Taquet, Beijing (CN); Sebastien Lasserre, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 469 days.

(21) Appl. No.: 18/554,338

(22) PCT Filed: Oct. 13, 2021

(86) PCT No.: PCT/CN2021/123665
§ 371 (c)(1),
(2) Date: Oct. 6, 2023

(87) PCT Pub. No.: WO2022/213572
PCT Pub. Date: Oct. 13, 2022

(65) Prior Publication Data
US 2024/0193818 A1     Jun. 13, 2024

(30) Foreign Application Priority Data

Apr. 9, 2021    (EP) ..................................... 21305461

(51) Int. Cl.
*G06T 9/00*          (2006.01)
(52) U.S. Cl.
CPC ..................................... *G06T 9/001* (2013.01)
(58) Field of Classification Search
CPC ........ G06T 9/001; G06T 9/004; H04N 19/597
See application file for complete search history.

(56) References Cited

U.S. PATENT DOCUMENTS 11,729,428 B2 *  8/2023  Ramasubramonian .....................
                                                 H04N 19/597
                                                 375/240.01
12,322,145 B2 *  6/2025  Martin-Cocher ...... H04N 19/70
                  (Continued)

FOREIGN PATENT DOCUMENTS

WO          2020070379 A2     4/2020

OTHER PUBLICATIONS

Office Action issued by the Intellectual Property India on Apr. 15, 2025, in corresponding Application No. IN 202347076142, 7 pages.

*Primary Examiner* — Utpal D Shah
(74) *Attorney, Agent, or Firm* — Finnegan, Henderson, Farabow, Garrett & Dunner, L.L.P.

(57)          ABSTRACT

A method of encoding a point cloud into a bitstream, each point of the point cloud being associated with spherical coordinates representing an azimuthal angle and a radius, includes: obtaining a scaled elementary azimuthal step associated with a point of the point cloud, the scaled elementary azimuthal step being equal to first data greater than an elementary azimuthal step in response to second data being strictly lower than a threshold, and being equal to the elementary azimuthal step otherwise; encoding, in the bitstream, a number of scaled elementary azimuthal steps obtained from an azimuthal angle of the point, a prediction of the azimuthal angle and the scaled elementary azimuthal step; and encoding, in the bitstream, an residual azimuthal angle of the point between the azimuthal angle of the point and a predicted azimuthal angle derived from the number of scaled elementary azimuthal steps and the scaled elementary azimuthal step.

20 Claims, 10 Drawing Sheets

(56) References Cited

U.S. PATENT DOCUMENTS

| | | | |
|---|---|---|---|
| 2020/0043186 A1* | 2/2020 | Selviah | G06T 7/33 |
| 2020/0394822 A1* | 12/2020 | Gao | G01S 17/89 |
| 2021/0104073 A1* | 4/2021 | Yea | H04L 65/70 |
| 2022/0321914 A1* | 10/2022 | Hur | H04N 19/597 |
| 2022/0358686 A1* | 11/2022 | Lasserre | H04N 19/96 |
| 2022/0366612 A1* | 11/2022 | Taquet | G06T 9/40 |
| 2022/0398784 A1* | 12/2022 | Taquet | G06T 9/001 |
| 2023/0328285 A1* | 10/2023 | Oh | H04N 19/70 |
| | | | 375/240.02 |

* cited by examiner

METHOD AND APPARATUS OF ENCODING/DECODING POINT CLOUD GEOMETRY DATA CAPTURED BY A SPINNING SENSORS HEAD

CROSS-REFERENCE TO RELATED APPLICATION

This application is a U.S. national phase application of International Patent Application No. PCT/CN2021/123665, filed on Oct. 13, 2021, which claims priority to European Patent Application No. EP21305461.2 filed on Apr. 9, 2021, the contents of both of which are hereby incorporated by reference in their entireties into this disclosure.

FIELD

The application generally relates to point cloud compression and, in particular to methods and apparatus of encoding/decoding point cloud geometry data captured by a spinning sensor head.

BACKGROUND

As a format for the representation of 3D data, point clouds have recently gained traction as they are versatile in their capability in representing all types of physical objects or scenes.

Virtual Reality (VR), Augmented Reality (AR) and immersive worlds have recently become a hot topic and are foreseen by many as the future of 2D flat video. The basic idea is to immerse the viewer in a surrounding environment, in contrast to a standard TV that only allows the viewer to look at the virtual world in front of him/her. There are several gradations in the immersivity depending on the freedom of the viewer in the environment. A point cloud is a good format candidate for distributing VR/AR worlds.

A point cloud is a set of points located in a tridimensional (3D) space, optionally with additional values attached to each of the points. These additional values are usually called attributes. Attributes may be, for example, three-component colors, material properties like reflectance and/or two-component normal vectors to a surface associated with a point.

A point cloud is thus a combination of a geometry (locations of the points in a 3D space usually represented by 3D cartesian coordinates x, y and z) and attributes.

Point clouds may be captured by various types of devices like an array of cameras, depth sensors, lasers (light detection and ranging, also known as Lidars), radars, or may be computer-generated (for example in movie post-production). Depending on the use cases, points clouds may have from thousands to up to billions of points for cartography applications. Raw representations of point clouds require a very high number of bits per point, with at least a dozen of bits per cartesian coordinate x, y or z, and optionally more bits for the attribute(s), for instance three times 10 bits for the colors.

SUMMARY

According to a first aspect, there is provided a method of encoding a point cloud into a bitstream of encoded point cloud data representing a physical object, each point of the point cloud being associated with spherical coordinates representing an azimuthal angle responsive to a capture angle of a sensor of a spinning sensor head that captured the point and a radius responsive of a distance of the point from a referential. The method comprises obtaining a scaled elementary azimuthal step associated with a point of the point cloud, the scaled elementary azimuthal step being equal to a first data greater than an elementary azimuthal step in response to a second data being strictly lower than a threshold, and the scaled elementary azimuthal step being equal to the elementary azimuthal step in response to the second data being equal to or greater than the threshold, the elementary azimuthal step being derived from frequencies and rotation speed at which a spinning sensor head captured the point cloud, and the second data depending on a decoded radius of the point obtained by encoding and decoding a radius associated with the point; encoding, in the bitstream, a number of scaled elementary azimuthal steps obtained from an azimuthal angle of the point, a prediction of the azimuthal angle and the scaled elementary azimuthal step; and encoding, in the bitstream, an residual azimuthal angle of the point between the azimuthal angle of the point and a predicted azimuthal angle derived from the number of scaled elementary azimuthal steps and the scaled elementary azimuthal step.

According to a second aspect, there is provided a method of decoding a point cloud from a bitstream of encoded point cloud data representing a physical object, each point of the point cloud being associated with spherical coordinates representing an azimuthal angle responsive to a capture angle of a sensor of a spinning sensor head that captured the point and a radius responsive of a distance of the point from a referential. The method comprises decoding an elementary azimuthal step from the bitstream; obtaining a decoded radius of a point of the point cloud from a decoded residual radius decoded from the bitstream; obtaining a scaled elementary azimuthal step associated with a point of the point cloud, the scaled elementary azimuthal step being equal to a first data greater than the elementary azimuthal step in response to a second data, depending on the decoded radius of the point, being strictly lower than a threshold, and the scaled elementary azimuthal step being equal to the elementary azimuthal step in response to the second data, depending on the decoded radius of the point, being greater than or equal to the threshold; decoding a number of scaled elementary azimuthal steps from the bitstream; decoding a decoded residual azimuthal angle from the bitstream; and obtaining a decoded azimuthal angle from the decoded residual azimuthal angle and a predicted azimuthal angle derived from the number of scaled elementary azimuthal steps and the scaled elementary azimuthal step.

According to a third aspect, there is provided an apparatus of encoding a point cloud into a bitstream of encoded point cloud data representing a physical object. The apparatus comprising one or more processors configured to carry out a method according to the first aspect of the disclosure.

BRIEF DESCRIPTION OF THE DRAWINGS

Reference will now be made, by way of example, to the accompanying drawings which show embodiments of the disclosure, and in which.

Similar reference numerals may have been used in different figures to denote similar components.

DESCRIPTION OF EXEMPLARY EMBODIMENTS

Figures 1, 2:
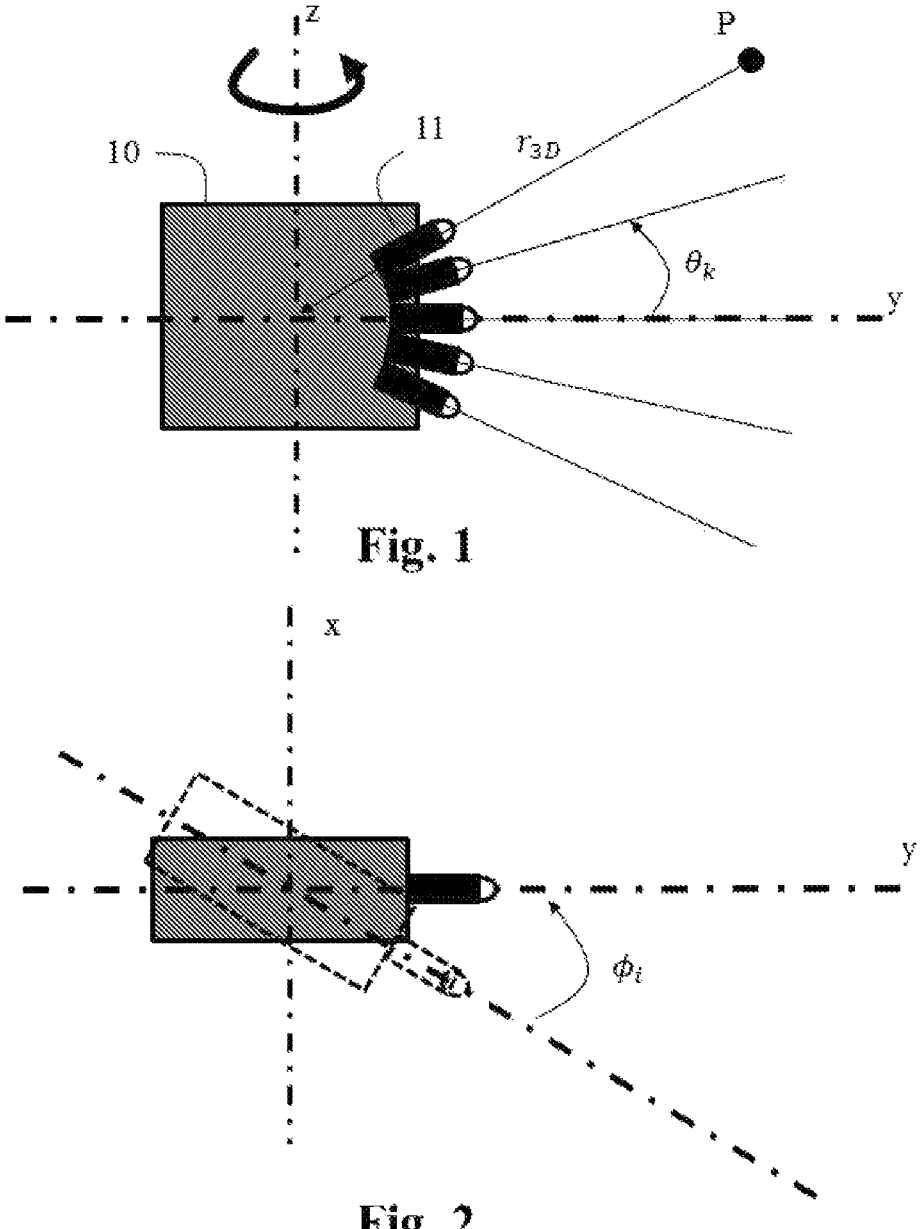
FIG. 1 illustrates a side view of a sensors head and some of its parameters in accordance with at least one embodiment of the disclosure.
FIG. 2 illustrates a top view of the sensors head and some of its parameters in accordance with at least one embodiment of the disclosure.

Example embodiments are described more fully hereinafter with reference to the accompanying figures, in which examples of at least one of embodiments are illustrated. An embodiment may, however, be embodied in many alternate forms and should not be construed as limited to the examples set forth herein. Accordingly, it should be understood that there is no intent to limit embodiments to the particular forms disclosed. On the contrary, the disclosure is intended to cover all modifications, equivalents, and alternatives falling within the spirit and scope of the disclosure.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Here, various aspects of the related art will be introduced below, which may be related to various aspects of at least one embodiments of the disclosure that is described and/or claimed below. This discussion is believed to be helpful in providing the reader with background information to facilitate a better understanding of the various aspects of the disclosure.

As a format for the representation of 3D data, point clouds have recently gained traction as they are versatile in their capability in representing all types of physical objects or scenes. Point clouds may be used for various purposes such as culture heritage/buildings in which objects like statues or buildings are scanned in 3D in order to share the spatial configuration of the object without sending or visiting it. Also, it is a way to ensure preserving the knowledge of the object in case it may be destroyed; for instance, a temple by an earthquake. Such point clouds are typically static, colored and huge.

Another use case is in topography and cartography in which using 3D representations allows for maps that are not limited to the plane and may include the relief. Google Maps is now a good example of 3D maps but uses meshes instead of point clouds. Nevertheless, point clouds may be a suitable data format for 3D maps and such point clouds are typically static, colored and huge.

Virtual Reality (VR), Augmented Reality (AR) and immersive worlds have recently become a hot topic and are foreseen by many as the future of 2D flat video. The basic idea is to immerse the viewer in a surrounding environment, in contrast to a standard TV that only allows the viewer to look at the virtual world in front of him/her. There are several gradations in the immersivity depending on the freedom of the viewer in the environment. A point cloud is a good format candidate for distributing VR/AR worlds.

The automotive industry, and more particularly foreseen autonomous cars, are also domains in which point clouds may be intensively used. Autonomous cars should be able to "probe" their environment to make good driving decisions based on the detected presence and nature of their immediate nearby objects and road configuration.

A point cloud is a set of points located in a tridimensional (3D) space, optionally with additional values attached to each of the points. These additional values are usually called attributes. Attributes may be, for example, three-component colors, material properties like reflectance and/or two-component normal vectors to a surface associated with a point.

A point cloud is thus a combination of a geometry (locations of the points in a 3D space usually represented by 3D cartesian coordinates x, y and z) and attributes.

Point clouds may be captured by various types of devices like an array of cameras, depth sensors, lasers (light detection and ranging, also known as Lidars), radars, or may be computer-generated (for example in movie post-production). Depending on the use cases, points clouds may have from thousands to up to billions of points for cartography applications. Raw representations of point clouds require a very high number of bits per point, with at least a dozen of bits per cartesian coordinate x, y or z, and optionally more bits for the attribute(s), for instance three times 10 bits for the colors.

It is important in many applications to be able to either distribute point clouds to an end-user or store them in a server by consuming only a reasonable amount of bitrate or storage space, while maintaining an acceptable (or preferably very good) quality of experience. Efficient compression of these point clouds is a key point in order to make the distribution chain of many immersive worlds practical.

Compression may be lossy (like in video compression) for the distribution to and visualization by an end-user, for example on AR/VR glasses or any other 3D-capable device. Other use cases do require lossless compression, like medical applications or autonomous driving, to avoid altering the results of a decision obtained from the subsequent analysis of the compressed and transmitted point cloud.

Until recently, point cloud compression (aka PCC) was not addressed by the mass market and no standardized point cloud codec was available. In 2017, the standardization working group ISO/JCT1/SC29/WG11, also known as Moving Picture Experts Group or MPEG, has initiated work items on point cloud compression. This has led to two standards, namely MPEG-I part 5 (ISO/IEC 23090-5) or Video-based Point Cloud Compression (V-PCC)

MPEG-I part 9 (ISO/IEC 23090-9) or Geometry-based Point Cloud Compression (G-PCC)

The V-PCC coding method compresses a point cloud by performing multiple projections of a 3D object to obtain 2D patches that are packed into an image (or a video when dealing with dynamic point clouds). Obtained images or videos are then compressed using already existing image/video codecs, allowing for the leverage of already deployed image and video solutions, By its very nature, V-PCC is efficient only on dense and continuous point clouds because image/video codecs are unable to compress non-smooth patches as would be obtained from the projection of, for example, Lidar-captured sparse geometry data.

The G-PCC coding method has two schemes for the compression of a captured geometry data.

The first scheme is based on an occupancy tree, being locally any type of tree among octree, quadtree or binary tree, representing the point cloud geometry. Occupied nodes are split down until a certain size is reached, and occupied leaf nodes provide the 3D locations of points, typically at the center of these nodes. The occupancy information is carried by occupancy flags signaling the occupancy status of each of the child nodes of nodes. By using neighbor-based prediction techniques, high level of compression of the occupancy flags can be obtained for dense point clouds. Sparse point clouds are also addressed by directly coding the position of point within a node with non-minimal size, by stopping the tree construction when only isolated points are present in a node; this technique is known as Direct Coding Mode (DCM).

The second scheme is based on a predictive tree in which each node represents the 3D location of one point and the parent/child relation between nodes represents spatial prediction from parent to children. This method can only address sparse point clouds and offers the advantage of lower latency and simpler decoding than the occupancy tree. However, compression performance is only marginally better, and the encoding is complex, relatively to the first occupancy-based method, because the encoder must intensively look for the best predictor (among a long list of potential predictors) when constructing the predictive tree.

In both schemes, attribute (de)coding is performed after complete geometry (de)coding, leading practically to a two-pass coding. Thus, the joint geometry/attribute low latency is obtained by using slices that decompose the 3D space into sub-volumes that are coded independently, without prediction between the sub-volumes. This may heavily impact the compression performance when many slices are used.

Combining together requirements on encoder and decoder simplicity, on low latency and on compression performance is still a problem that has not been satisfactory solved by existing point cloud codecs.

An important use case is the transmission of sparse geometry data captured by a spinning sensor head, e.g. a spinning Lidar head, mounted on a moving vehicle. This usually requires a simple and low-latency embarked encoder. Simplicity is required because the encoder is likely to be deployed on computing units which perform other processing in parallel, such as (semi-) autonomous driving, thus limiting the processing power available to the point cloud encoder. Low latency is also required to allow for fast transmission from the car to a cloud in order to have a real-time view of the local traffic, based on multiple-vehicle acquisition, and take adequate fast decision based on the traffic information. While transmission latency can be low enough by using 5G, the encoder itself shall not introduce too much latency due to coding. Also, compression performance is extremely important since the flow of data from millions of cars to the cloud is expected to be extremely heavy.

Specific priors related to sparse geometry data captured by a spinning sensor head have been already exploited to get very efficient encoding/decoding methods.

For example, G-PCC exploits the elevation angle (relative to the horizontal ground) of capture from a spinning sensor head as depicted on FIGS. 1 and 2. A spinning sensor head 10 comprises a set of sensors 11 (for example lasers), here five sensors are represented. The spinning sensor head 10 may spin around a vertical axis z to capture geometry data of a physical object, i.e. the 3D locations of points of the point cloud. The geometry data captured by the spinning sensor head is then represented in spherical coordinates $(r_{3D}, \phi, \theta)$, where $r_{3D}$ is the distance of a point P from the spinning sensor head's center, $\phi$ is an azimuthal angle of the sensor head's spin relative to a referential, and $\theta$ is an elevation angle for an elevation angle index k of a sensor of the spinning sensor head relative to a horizontal referential plane (here the y axis). The elevation angle index k may be, for instance, an elevation angle of a sensor k, or a k-th sensor position, in case a single sensor is successively probing for the each one of the successive elevation angles.

Figure 3:
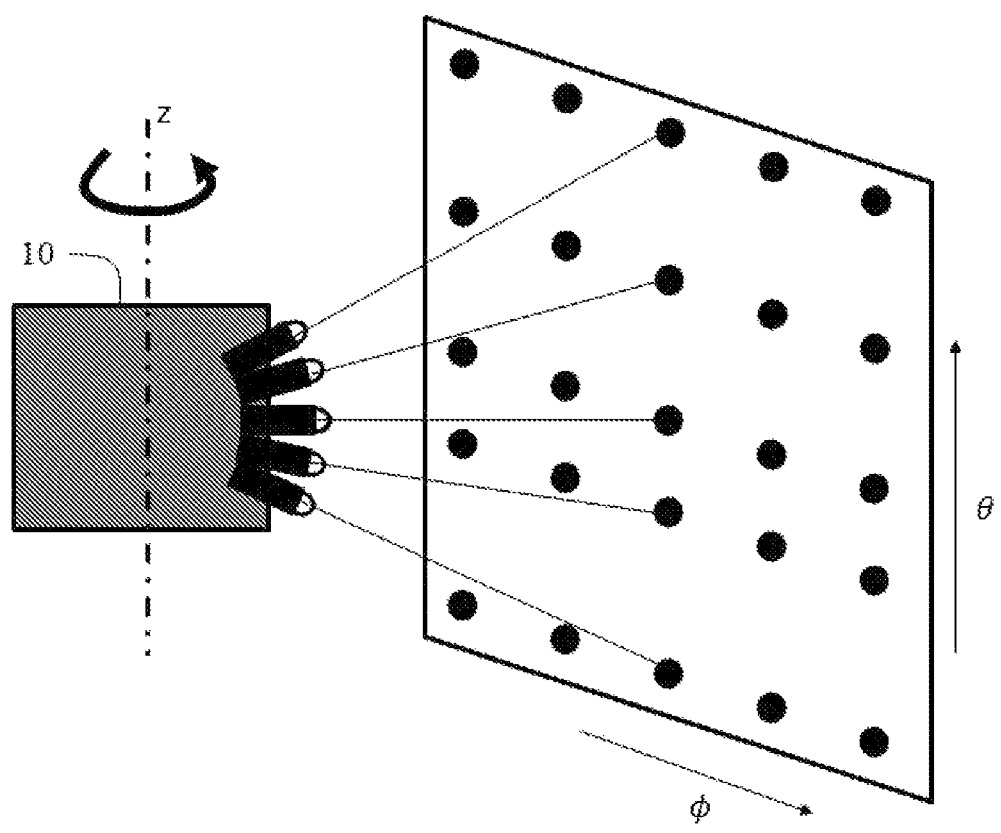
FIG. 3 illustrates a regular distribution of data captured by a spinning sensors head in accordance with at least one embodiment of the disclosure.

A regular distribution along the azimuthal angle has been observed on geometry data captured by a spinning sensor head as depicted on FIG. 3. This regularity is used in G-PCC to obtain a quasi 1D representation of the point cloud where, up to noise, only a radius $r_{3D}$ belongs to a continuous range of values while the angles $\phi$ and $\theta$ take only a discrete number of values $\phi_i \forall_i = 0$ to I–1 where I is a number of azimuthal angles used for the capture of the points and $\theta_k \forall k = 0$ to K–1 where K is a number of sensors of the spinning sensor head 10. Basically, G-PCC represents sparse geometry data captured by a spinning sensor head on a 2D discrete angular plane $(\phi, \theta)$ as depicted on FIG. 3, together with a radius value $r_{3D}$ for each point.

This quasi 1D property has been exploited in G-PCC in both the occupancy tree and the predictive tree by predicting, in the spherical coordinates space, the location of a current point based on an already coded point by using the discrete nature of angles.

More precisely, the occupancy tree uses DCM intensively and entropy codes the direct locations of points within a node by using a context-adaptive entropy coder. Contexts are then obtained from the local conversion of the point locations into coordinates $(\phi, \theta)$ and from the location of these coordinates relative to discrete coordinates $(\phi_i, \theta_k)$ obtained from already coded points.

Figure 4:
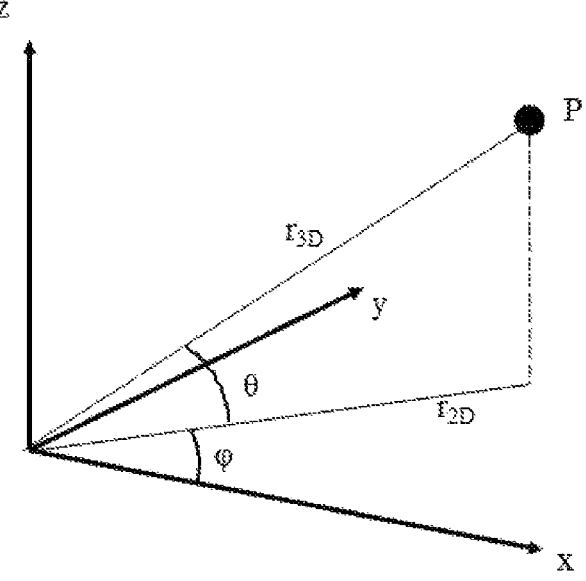
FIG. 4 illustrates a representation of a point in a 3D space in accordance with at least one embodiment of the disclosure.

The predictive tree directly codes a first version of location of a current point P in the spherical coordinates $(r, \phi, \theta)$, where r is the projected radius on the horizontal xy plane as depicted on FIG. 4 by $r_{2D}$, using the quasi 1D nature $(r, \phi_i, \theta_k)$ of this coordinate space. Then, spherical coordinates $(r, \phi, \theta)$ are converted into 3D cartesian coordinates (x,y,z) and a xyz residual is coded to tackle the errors of coordinate conversion, the approximation of elevation and azimuthal angles and potential noise.

Figures 5, 6:
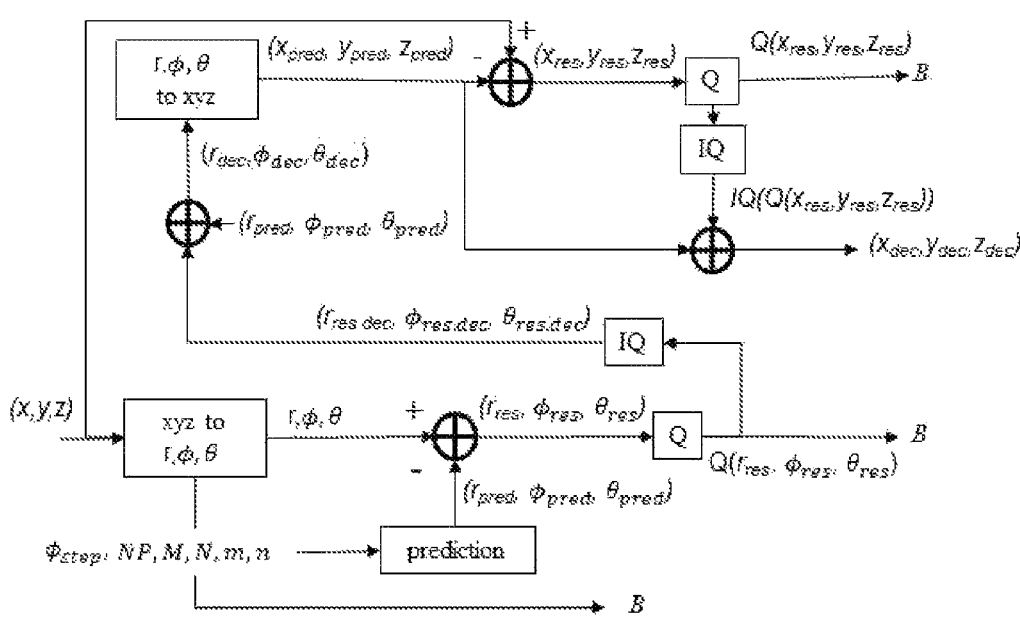
FIG. 5 illustrates a point cloud encoder that is similar to G-PCC predictive tree based encoder in accordance with at least one embodiment of the disclosure.
FIG. 6 illustrates a point cloud decoder that is similar to G-PCC predictive tree based decoder according to an embodiment of the disclosure.

FIG. 5 illustrates a point cloud encoder that is similar to G-PCC predictive tree based encoder.

First, cartesian coordinates (x,y,z) of points of the point cloud are transformed into spherical coordinates $(r, \phi, \theta)$ by $(r, \phi, \theta) = C2A(x,y,z)$.

The transformation function C2A(·) is partly given by:

$$r = \text{round}(\text{sqrt}(x*x + y*y)/\Delta Ir)$$

$$\phi = \text{round}(a \tan 2(y,x)/\Delta I\phi)$$

where round( ) is the rounding operation to the nearest integer value, sqrt( ) is the square root function and a tan 2(y,x) is the arc tangent applied to y/x.

$\Delta Ir$ and $\Delta I\phi$ are internal precisions for radiuses and azimuthal angles respectively. They are typically the same as their respective quantization steps, i.e. $\Delta I\phi = \Delta\phi$, and $\Delta Ir = \Delta r$ with $$\Delta\phi = \frac{2\pi}{2^N}$$

and, $$\Delta r = 2M * \text{elementary quantization step}$$

where M and N are two parameters of the encoder that may be signaled in a bitstream, for example in a geometry parameter set, and where elementary quantization step is typically equal to 1. Typically, N may be 17, and M may be 0) for lossless coding.

The encoder may derive $\Delta\phi$ and $\Delta r$ by minimizing the cost (e.g. the number of bits) for coding the spherical coordinates representation and the xyz residual in cartesian space.

For sake of simplicity, $\Delta\phi = \Delta I\phi$ and $\Delta r = \Delta Ir$ hereafter.

Also for sake of clarity and simplicity, e is used hereafter as an elevation angle value, that is obtained, for instance using $$\theta = \text{atan}\left(\frac{z}{r}\right),$$

where a tan(·) is an arc tangent function. But, in G-PCC for instance $\theta$ is an integer value representing the elevation angle index k of $\theta_k$ (i.e. the index of the k-th elevation angle), and so operations presented hereafter (prediction, residual (de)coding, etc. . . . ) performed on $\theta$ would be applied on the elevation angle index instead. Someone skilled in point cloud compression would easily understand the advantage of using index k, and how to use elevation angle index k instead of $\theta$. Also, someone skilled in point cloud compression would easily understand that this subtility does not affect the principle of the proposed disclosure.

Residual spherical coordinates ($r_{res}$ $\phi_{res}$, $\theta_{res}$) between spherical coordinates (r, $\phi$, $\theta$) and predicted spherical coordinates obtained from a predictor $PR_n$ are then given by:

$$(r_{res},\phi_{res},\theta_{res}) = (r,\phi,\theta) - (r_{pred},\phi_{pred},\theta_{pred}) = (r,\phi,\theta) - (r_n, \phi_n,\theta_n) - (0,m*\phi_{step},0) \quad (1)$$

where ($r_n$, $\phi_n$, $\theta_n$) are a predicted radius, predicted azimuthal angle and predicted elevation angle obtained from a predictor selected from a list of candidate predictors $PR_0$, $PR_1$, $PR_2$ and $PR_3$ and m is an integer number of elementary azimuthal steps $\phi_{step}$ to be added to a prediction of the azimuthal angle.

The elementary azimuthal step $\phi_{step}$ may be derived by the encoder from the frequencies and rotation speed at which a spinning sensors head is performing capture at the different elevation angles, for example from NP the number of probing per head turn:

$$\phi_{step} = \frac{2*\pi}{NP*\Delta I\phi} \quad (2)$$

The elementary azimuthal step $\phi_{step}$ of the number of probing per head turn NP is encoded in a bitstream B in a geometry parameter set for example. Alternatively NP is a parameters of the encoder that may be signaled in a bitstream in a geometry parameter set, and $\phi_{step}$ is similarly derived in both encoder and decoder.

The residual spherical coordinates ($r_{res}$, $\phi_{res}$, $\theta_{res}$) may be encoded in a bitstream B.

The residual spherical coordinates ($r_{res}$, $\phi_{res}$, $\theta_{res}$) may be quantized (Q) in quantized residual spherical coordinates $Q(r_{res}$, $\phi_{res}$, $\theta_{res})$. Quantized residual spherical coordinates $Q(r_{res}$, $\phi_{res}$, $\theta_{res})$ may be encoded in a bitstream B.

The prediction index n and the number m are signalled in the bitstream B for each node of the predictive tree, while the elementary azimuthal step $\phi_{step}$ with some fixed-point precision is shared by all nodes of a same predictive tree.

The prediction index n points to a selected predictor among a list of candidate predictors.

A candidate predictor $PR_0$ may equal to ($r_{min}$, $\phi_0$, $\theta_0$), where $r_{min}$ is the minimum radius value (provided in the geometry parameter set), and $\phi_0$ and $\theta_0$ are equal to 0 if a current node (current point P) has no parent or are equal to azimuthal and elevation angles of the point associated with the parent node.

Another candidate predictor $PR_1$ may equal to ($r_0$, $\phi_0$, $\theta_0$), where $r_0$, $\phi_0$ and $\theta_0$ are respectively the radius, azimuthal and elevation angle of the point associated with the parent node of a current node.

Another candidate predictor PR; may equal to a linear prediction of the radius, azimuthal and elevation angles using the radius, azimuthal and elevation angles ($r_0$, $\phi_0$, $\theta_0$), of the point associated with the parent node of a current node, and the radius, azimuthal and elevation angle ($r_1$, $\phi_1$, $\theta_1$) of the point associated with the grand-parent node.

For example, $PR_2 = 2*(r_0,\phi_0,\theta_0) - (r_1,\phi_1,\theta_1)$

Another candidate predictor PRs may equal to a linear prediction of the radius, azimuthal and elevation angles using the radius, azimuthal and elevation angles ($r_0$, $\phi_0$, $\theta_0$) of the point associated with the parent node of a current node, the radius, azimuthal and elevation angles ($r_1$, $\phi_1$, $\theta_1$) of the point associated with the grand-parent node and the radius and the azimuthal and elevation angles ($r_2$, $\phi_2$, $\theta_2$) of the point associated with the great grand-parent.

For example, $PR_3 = (r_0,\phi_0,\theta_0) + (r_1,\phi_1,\theta_1) - (r_2,\phi_2,\theta_2)$ Predicted cartesian coordinates ($x_{pred}$, $y_{pred}$, $z_{pred}$) are obtained by inverse transforming decoded spherical coordinates ($r_{dec}$, $\phi_{dec}$, $\theta_{dec}$) by:

$$(x_{pred},y_{pred},z_{pred}) = A2C(r_{dec},\phi_{dec},\theta_{dec}) \quad (3)$$

where decoded spherical coordinates ($r_{dec}$, $\phi_{dec}$, $\theta_{dec}$), as by a decoder, may be given by:

$$(r_{dec}, \phi_{dec}, \theta_{dec}) = (r_{res,dec},\phi_{res,dec},\theta_{res,dec}) + (r_{pred},\phi_{pred}, \theta_{pred}) = (r_{res,dec},\phi_{res,dec},\theta_{res,dec}) + (r_n,\phi_n,\theta_n) + (0,m* \phi_{step},0) \quad (4)$$

where ($r_{res,dec}$, $\phi_{res,dec}$, $\theta_{res,dec}$) are decoded residual spherical coordinates, as by a decoder.

The decoded residual spherical coordinates ($r_{res,dec}$, $\phi_{res,dec}$, $\theta_{res,dec}$) may be the result of the inverse quantization (IQ) of quantized residual spherical coordinates $Q(r_{res}$, $\phi_{res}$, $\theta_{res})$.

In G-PCC, there is no quantization of residual spherical coordinates, and the decoded spherical coordinates ($r_{res,dec}$, $\phi_{res,dec}$, $\theta_{res,dec}$) equal the residual spherical coordinates $(r_{res}, \phi_{res}, \theta_{res})$. The decoded spherical coordinates $(r_{dec}, \phi_{dec}, \theta_{dec})$ are then equal to the spherical coordinates $(r, \phi, \theta)$.

Inverse transforming decoded spherical coordinates $(r_{dec}, \phi_{dec}, \theta_{dec})$ may be given by:

$$r = r_{dec} * \Delta r$$

$$x_{pred} = \text{round}(r * \cos(\phi_{dec} * \Delta\phi))$$

$$y_{pred} = \text{round}(r * \sin(\phi_{dec} * \Delta\phi)$$

$$z_{pred} = \text{round}(\tan(\theta_{dec}) * r)$$

where $\sin(\ )$ and $\cos(\ )$ are sine and cosine functions. These two functions may be approximated by operations working on fixed-point precision. The values $\tan(\theta_{dec})$ may be also stored as fixed-point precision values. Consequently, no floating-point operation is used in the decoder. Avoiding floating point operations is usually a strong requirement to ease the hardware implementations of codecs.

Residual cartesian coordinates $(x_{res}, y_{res}, z_{res})$ between the original points and predicted cartesian coordinates $(x_{pred}, y_{pred}, z_{pred})$ are given by:

$$(x_{res}, y_{res}, z_{res}) = (x, y, z) - (x_{pred}, y_{pred}, z_{pred})$$

Residual cartesian coordinates $(x_{res}, y_{res}, z_{res})$ are quantized $(Q)$ and quantized residual cartesian coordinates $Q(X_{res}, y_{res}, z_{res})$ are encoded into the bitstream.

Residual cartesian coordinates may be lossless coded when x,y,z quantization steps are equal to the original point precision (typically 1), or lossy coded when quantization steps are larger than the original point precision (typically quantization steps larger than 1).

Decoded cartesian coordinates $(x_{dec}, y_{dec}, z_{dec})$, as by a decoder, are given by:

$$(x_{dec}, y_{dec}, z_{dec}) = (x_{pred}, y_{pred}, z_{pred}) + IQ(Q(x_{res}, y_{res}, z_{res})) \quad (5)$$

where $IQ(Q(x_{res}, y_{res}, z_{res}))$ represents inverse-quantized quantized residual cartesian coordinates.

Those decoded cartesian coordinates $(x_{dec}, y_{dec}, z_{dec})$ may be used by the encoder for example for ordering (decoded) points before attribute coding.

FIG. 6 illustrates a point cloud decoder that is similar to G-PCC predictive tree based decoder for the predictive tree.

A prediction index n and a number m are accessed from the bitstream B for each node of the predictive tree, while the elementary azimuthal step $\phi_{step}$ or the number of probing per head turn NP is accessed from the bitstream B, for example from a parameter set, and is shared by all nodes of a same predictive tree.

Decoded residual spherical coordinates $(r_{res,dec}, \phi_{res,dec}, \theta_{res,dec})$ may be obtained by decoding residual spherical coordinates $(r_{res}, \phi_{res}, \theta_{res})$ from the bitstream B.

Quantized residual spherical coordinates $Q(r_{res}, \phi_{res}, \theta_{res})$ may be decoded from the bitstream B. The quantized residual spherical coordinates $Q(r_{res}, \phi_{res}, \theta_{res})$ are inverse quantized to obtain decoded residual spherical coordinates $(r_{res,dec}, \phi_{res,dec}, \theta_{res,dec})$.

Decoded spherical coordinates $(r_{dec}, \phi_{dec}, \theta_{dec})$ are obtained by adding decoded residual spherical coordinates $(r_{res,dec}, \phi_{res,dec}, \theta_{res,dec})$ and predicted spherical coordinates $(r_{pred}, \phi_{pred}, \theta_{pred})$ according to equation (4).

Predicted cartesian coordinates $(x_{pred}, y_{pred}, z_{pred})$ are obtained by inverse transforming decoded spherical coordinates $(r_{dec}, \phi_{dec}, \theta_{dec})$ according to equation (3).

Quantized residual cartesian coordinates $Q(x_{res}, y_{res}, z_{res})$ are decoded from the bitstream B and inverse quantized to obtain inverse quantized cartesian coordinates $IQ(Q(x_{res}, y_{res}, z_{res}))$. The decoded cartesian coordinates $(x_{dec}, y_{dec}, z_{dec})$ are given by equation (5).

In G-PCC, equations (1) and (4) are used to predict the azimuthal angle $\phi$ and to obtain decoded azimuthal angle $\phi_{dec}$, and equation (5) is used to decode the cartesian coordinates of a point.

Then, when the radius is sufficiently small (i.e. when points are sufficiently close to the LiDAR sensor), it is possible that using a different value of 'm' in equation (1) and (4) (for instance m+1 or m−1) would result in the same (quantized) cartesian residual values.

Figure 7:
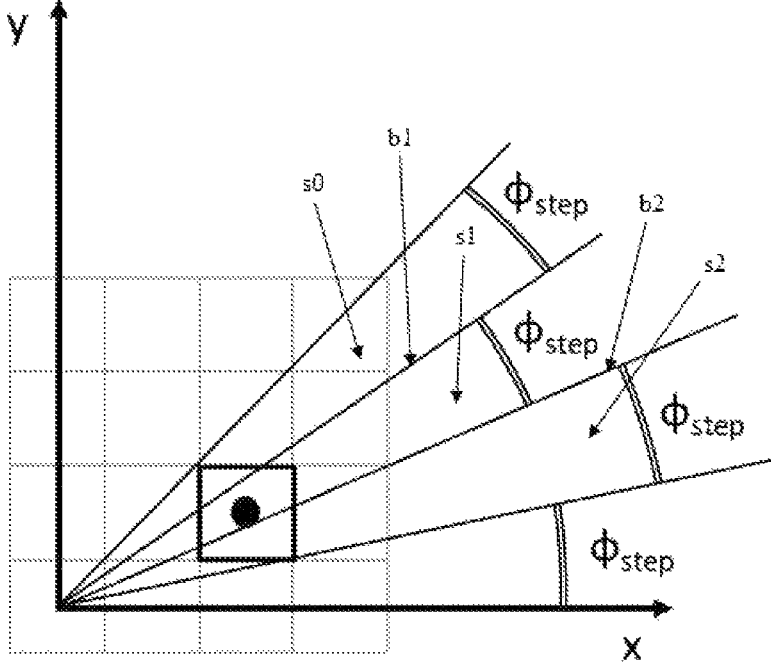
FIG. 7 illustrates a drawback of the G-PCC in accordance with at least one embodiment of the disclosure.

This drawback of G-PCC is illustrated on FIG. 7. In the example of FIG. 7, a point of the decoded point cloud (black circle) belongs to a square in a xy cartesian space. The squares correspond to a regular sampling of x and y axis in the cartesian space. The size of the squares depends on the precision of the input point cloud, in case of lossless compression, or it roughly depends to quantization step in case of lossy compression. Angular sectors with angle $\phi_{step}$ represents areas covered by a sensor of a spinning sensor head 10 between two captures. Here, the point belongs to a square that is crossed by two laser beams b1 and b2 corresponding to two sensors orientations, for two successive probings/captures made with a same elevation angle. Consequently, the square is covered by three angular sectors s0, s1 and s2. Then, to calculate a predicted azimuthal angle (equations (1) or (4)), a number 'm' shall be selected here between two values m1 (associated with the laser beam b1) and m2 (associated with laser beam b2). Having the possibility to encode several (here 2, m1 and m2) different m values for a same point of the point cloud, may result to a sub-optimal coding of a number m (for example m1) compared to the coding of another number m that would be obtained if $\phi_{step}$ was sufficiently high to have a single laser beam crossing the square to which belongs the point. Consequently, relatively to the radius of the point (i.e. its distance from the sensor), the angular precision obtained by using the elementary azimuthal step $\phi_{step}$ is too high in comparison to the cartesian precision of the output. Consequently, having the possibility to encode several different numbers indicates a sub-optimality in the coding scheme, and compression can be improved.

In order to improve G-PCC, a better coding of the number of elementary azimuthal steps m is needed.

At least one of the aspects generally relates to point cloud encoding and decoding, and at least one other aspect generally relates to transmitting a bitstream generated or encoded.

Moreover, the present aspects are not limited to MPEG standards such as MPEG-I part 5 or part 9 that relate to the Point Cloud Compression, and may be applied, for example, to other standards and recommendations, whether pre-existing or future-developed, and extensions of any such standards and recommendations (including MPEG-I part 5 and part 9). Unless indicated otherwise, or technically precluded, the aspects described in the disclosure may be used individually or in combination.

The disclosure relates to a field of encoding and decoding technology, aims to provide a technical solution of encoding/decoding point cloud data. Since the point cloud is a set of mass data, a large amount of memory may be consumed by storing the point cloud, also it is impossible to transmit the point cloud directly in the network layer without compressing the point cloud, so that it is required to compress the point cloud. Therefore, the disclosure can be used in many application scenarios, as the point cloud is more and more widely used in autonomous navigation, real-time inspection, geographic information service, culture heritage/buildings protection, 3D immersion communication and interaction, and so on.

The present encoding/decoding method particularly relates to encoding/decoding the point cloud data based on the dynamically list scaled azimuthal angle step, to improve the compression performance of the point cloud.

The disclosure relates to a method of encoding/decoding a point cloud into/from a bitstream of encoded point cloud data representing a physical object, each point of the point cloud being associated with spherical coordinates representing an azimuthal angle responsive to a capture angle of a sensor of a spinning sensor head that captured the point and a radius responsive of a distance of the point from a referential.

The methods comprises a scaling of the elementary azimuthal step used for calculating a predicted azimuthal angle of an azimuthal angle of a point of the point cloud, from a decoded radius of said point. The azimuthal angle step is thus scaled dynamically and thus depends on the radius of the points of the point cloud.

When the radius of a point is too small for using efficiently the elementary azimuthal step step, multiple numbers m may be chosen as illustrated on FIG. 7. But, scaling the elementary azimuthal step by a value greater than 1 statistically reduces the number of angular sectors covering all the squares any points with same radius would belong to and thus statistically reduces or even eliminates the use of an unnecessary extra number of elementary azimuthal steps to be coded for that points, because, in average, only a single (or very few) angular sectors cover the squares the points belong to (if the scaling factor is well chosen). The impact of this scaling is a reduction of the average number m to be coded (averaged over all the coded points) and implicitly a reduction of the average cost (number of bits averaged on all coded points) for coding the number m of elementary azimuthal steps because the coding of unnecessary extra number of elementary azimuthal steps is avoided (at least reduced).

Figure 8:
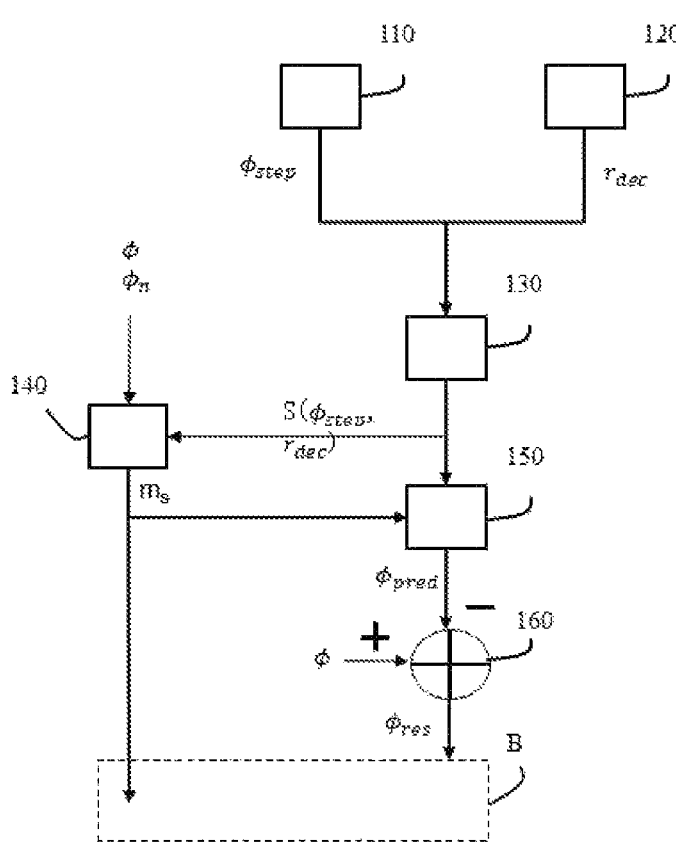
FIG. 8 illustrates a block diagram of steps of the method 100 of encoding a point cloud representing a physical object in accordance with at least one embodiment.

FIG. 8 illustrates a block diagram of steps of a method 100 of encoding a point cloud representing a physical object in accordance with at least one embodiment.

In step 110, an elementary azimuthal step $\phi_{step}$ may be given by equation (2).

In step 120, a decoded radius $r_{dec}$ of a point of the point cloud may be obtained by equation (4):

$$r_{dec}=r_{res,dec}+r_n \tag{6}$$

where $r_n$ is a predicted radius given by a predictor $PR_n$.

In step 130, a scaled elementary azimuthal step $S(\phi_{step}, r_{dec})$ equals a first data D1 greater than the elementary azimuthal step $\phi_{step}$ when a second data D2, depending on the decoded radius Idec, is strictly lower than a threshold TH, and the scaled elementary azimuthal step $S(\phi_{step}, r_{dec})$ equals the elementary azimuthal step $\phi_{step}$ otherwise.

In step 140, a number $m_s$ of scaled elementary azimuthal steps is encoded in the bitstream B. The number $m_s$ is obtained from the azimuthal angle $\phi$ of the point, a prediction of the azimuthal angle $\phi_n$ and the scaled elementary azimuthal step $S(\phi_{step}, r_{dec})$:

$$m_s=\text{round}((\phi-\phi_n)/S(\phi_{step}, r_{dec}))$$

In step 150, a predicted azimuthal angle $\phi_{pred}$ is derived from the scaled elementary azimuthal step $S(\phi_{step}, r_{dec})$ and the number $m_s$:

$$\phi_{pred}=\phi_n+m_s*S(\phi_{step}, r_{dec}) \tag{7}$$

In step 160, a residual azimuthal angle $\phi_{res}$ is encoded in the bitstream B. The residual azimuthal angle $\phi_{res}$ may be calculated between the azimuthal angle $\phi$ of the point and the predicted azimuthal angle $\phi_{pred}$.

$$\phi_{res}=\phi-\phi_{pred}=\phi-\phi_n-m_s*S(\phi_{step}, r_{dec}) \tag{8}$$

Figure 9:
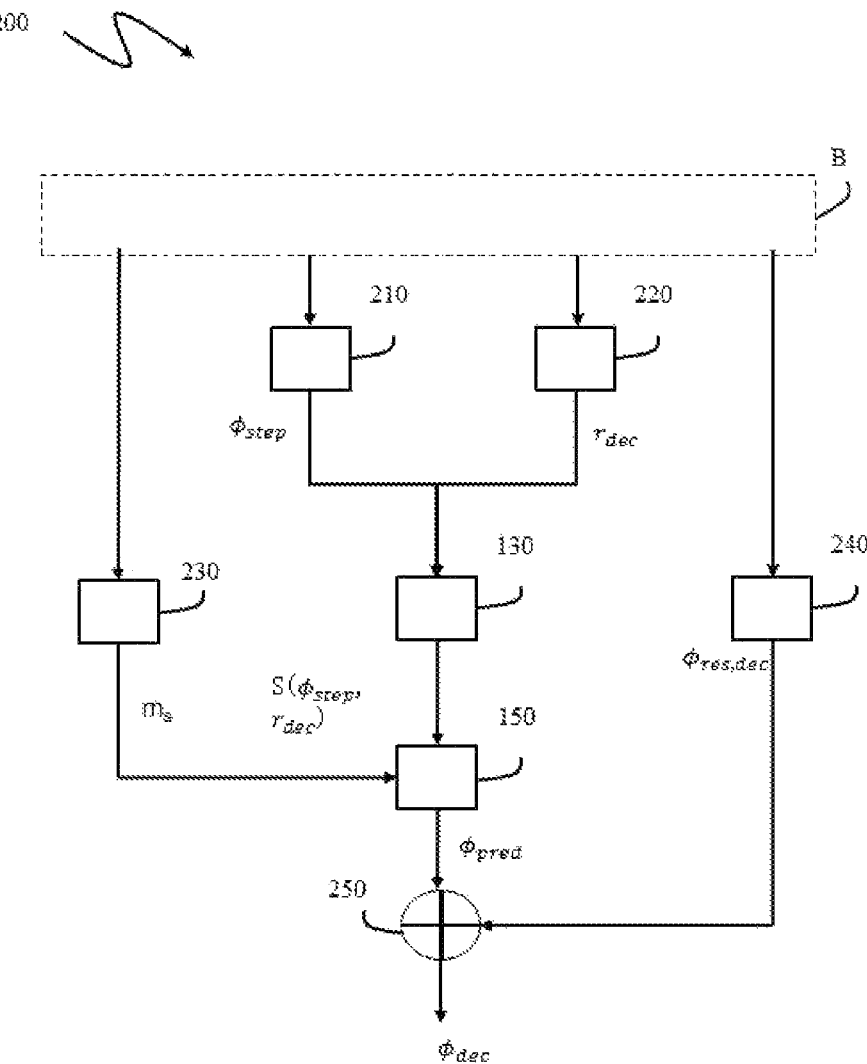
FIG. 9 illustrates a block diagram of steps of the method 200 of decoding a point cloud representing a physical object in accordance with at least one embodiment.

FIG. 9 illustrates a block diagram of steps of a method 200 of decoding a point cloud representing a physical object in accordance with at least one embodiment.

In step 210, an elementary azimuthal step $\phi_{step}$ or a number of probing per head turn NP may be decoded from the bitstream B, for example from a geometry parameter set.

In step 220, a decoded residual radius $r_{res,dec}$ is decoded from the bitstream B. A decoded radius $r_{dec}$ may be then obtained by equation (6).

In step 130, a scaled elementary azimuthal step $(S(\phi_{step}, r_{dec}))$ associated with a point of the point cloud is obtained.

In step 230, a number m, of scaled elementary azimuthal steps is decoded from the bitstream B.

In step 150, a predicted azimuthal angle $\phi_{pred}$ is derived from equation (7).

In step 240, a decoded residual azimuthal angle $\phi_{res}$,dec is decoded from the bitstream B.

In step 250, a decoded azimuthal angle $\phi_{dec}$ is obtained from the decoded residual azimuthal angle $\phi_{res}$ dec and the predicted azimuthal angle $\phi_{pred}$:

$$\phi_{dec}=\phi_{res,dec}+\phi_{pred}=\phi_{res,dec}+\phi_n+m_s*S(\phi_{step}, r_{dec}) \tag{9}$$

In one embodiment, the disclosure may be used in the G-PCC prediction scheme given by equation (1) or (4) in which the azimuthal angles $\phi$ associated with a point of the point cloud is adaptively quantized as described in the european patent application no EP20306674.

$Q(r_{res}, \phi_{res}, \theta_{res})$, described in relation with FIGS. 5 and 6, is set equal to $(r_{res}, Q\phi_{res}, \theta_{res})$, where $r_{res}$ is a residual radius, $Q\phi_{res}$ is an adaptively quantized residual azimuthal angle, as described hereafter, and $\theta_{res}$ is a non quantized elevation angle (index) residual.

At the encoding side, a residual radius $r_{res}$ is obtained from equation (1), and a decoded radius $r_{dec}$ is obtained from equation (4).

A residual azimuthal angle $\phi_{res}$ obtained by equation (1) is adaptively quantized by:

$$Q\phi_{res}=Q_\phi(\phi_{res}, r_{dec})=\text{round}(\phi_{res}/\Delta\phi(r_{dec})) \tag{10}$$

where $Q_\phi$ is an adaptive quantizer using a quantization step $\Delta\phi(r_{dec})$ given by:

$$\Delta\phi(r_{dec})=\Delta\phi_{arc}/r_{dec}. \tag{11}$$

with $\Delta\phi_{arc}$ an arc quantization step.

If the codec is using fixed-point precision arithmetic and internal precision $\Delta I\phi$ of the codec for the representation of an azimuthal angle is given by $\Delta I\phi=2\times/2^N$, the arc quantization step $\Delta\phi_{arc}$ is for instance set equal to $2\pi/(x*\Delta I\phi)=2^N/x$ with x=8 for example.

An inverse quantized residual azimuthal angle $IQ\phi_{res}$ is obtained by inverse quantizing $Q\phi_{res}$ by:

$$IQ\phi_{res}=IQ_\phi(Q\phi_{res}, r_{dec})=Q\phi_{res}*\Delta\phi(r_{dec}) \tag{12}$$

where $IQ_\phi$ is an adaptive inverse quantizer based on the decoded radius $r_{dec}$ A decoded azimuthal angle $\phi_{dec}$ may be given by:

$$\phi_{dec}=IQ\phi_{res}+\phi_n+m_s*S(\phi_{step}, r_{dec}) \tag{13}$$

or by:

$$\phi_{dec}=Q\phi_{res}*\Delta\phi(r_{dec})+\phi_n+m_s*S(\phi_{step}, r_{dec})= Q\phi_{res}*\Delta\phi_{arc}/r_{dec}+\phi_n+m_s*S(\phi_{step}, r_{dec}) \tag{14}$$

The quantized residual azimuthal angle $Q\phi_{res}$ is encoded in the bitstream B.

In one embodiment, encoding/decoding a residual azimuthal angle $\phi_{res}$ between an azimuthal angle of a point of the point cloud and a prediction angle of said azimuthal angle may be improved by using a bound property given by:

$$|\phi_{res}| \le B$$

where $|\phi_{res}|$ is an absolute value of a residual azimuthal angle $\phi_{res}$, and is bounded by an integer bound B given by:

$$B = Q_\phi(\phi_{step}/2, r_{dec}) = \text{round}(r_{dec}*(\phi_{step}/2)/\Delta\phi_{arc})) = \text{round}(r_{dec}*\phi_{step}/(2*\Delta\phi_{arc})) \quad (15)$$

where $\Delta\phi_{arc} = 2\pi/(x*\Delta I\phi) = 2^N/x$ with x=8 for example.

In one embodiment of step 130, the first data D1 depends on the decoded radius $r_{dec}$ and the second data D2 is the decoded radius $r_{dec}$.

In that embodiment, when the decoded radius $r_{dec}$ (D2) is strictly lower than the threshold TH then the scaled elementary azimuthal step $S(\phi_{step}, r_{dec})$ equals the first data D1 greater than the elementary azimuthal step $\phi_{step}$, and the scaled elementary azimuthal step $S(\phi_{step}, r_{dec})$ equals the elementary azimuthal step $\phi_{step}$ otherwise.

In a variant, the first data D1 is inversely proportional to a product of the decoded radius and a scaling factor $\alpha$ greater than or equal to 1.

For example, $$D1 = 2\pi/(r_{dec}*\alpha*\Delta I\phi) \quad (16)$$

This defines a scaled elementary azimuthal step $S(\phi_{step}, r_{dec})$ as being greater than the elementary azimuthal step $\phi_{step}$ when the decoded radius $r_{dec}$ is small enough (i.e. when $r_{dec}*\alpha$ is smaller than the number of probing per turn NP, or equivalently $r_{dec} < NP/\alpha$). Then, the use of an unnecessary extra number of elementary azimuthal steps is reduced for "small" decoded radius, and the coding cost (i.e. number of bits required for the coding) of the number $m_s$ is reduced. An optimal threshold to use would then be TH=NP/$\alpha$.

In a variant, if the internal precision $$\Delta I\phi = \frac{2\pi}{2^N},$$

the residual azimuthal angle is adaptively quantized by equation (10) with $\Delta\phi_{arc} = 2^N/x$ and $\alpha$ is set equal to x, equation (16) can be rewritten as:

$$D1 = 2^N/(r_{dec}*\alpha) \quad (17)$$

In a variant, the threshold TH equals a threshold $Th_0$ given by:

$$Th_0 = \Delta\phi_{arc}/\phi_{step} \quad (18)$$

The threshold $Th_0$ may be obtained as follows when the residual azimuthal angle is bounded by the integer bound B: when B=0, it is better to use $S(\phi_{step}, r_{dec}) = D1$ and when B>0 to use $S(\phi_{step}, r_{dec}) = \phi_{step}$. Then, from equation (15), the bound B equals 0. i.e. the bound B is strictly lower than 1 (B<1) since bound B is equal to a positive number rounded to an integer value, when the following equivalent inequalities are fulfilled:

$$B = 0 \Leftrightarrow B < 1 \Leftrightarrow Q_\phi\left(\frac{\phi_{step}}{2}, r_{dec}\right) < 1 \Leftrightarrow r_{dec}*\frac{\phi_{step}/2}{\Delta\phi_{arc}} + 0.5 < 1$$

The threshold $Th_0$ is then deduced from the upper bound of the inequality, occurring when B=1, by solving:

$$Q_\phi\left(\frac{\phi_{step}}{2}, Th_0\right) = 1,$$

and thus obtaining:

$$Th_0 = (1-0.5)*\Delta\phi_{arc}*2/\phi_{step} = \Delta\phi_{arc}/\phi_{step} \quad (19)$$

The threshold $Th_0$ given by equation (18) may either be used in variants where the residual azimuthal angle is or not adaptively quantized by equation (10) and either in variants where the residual azimuthal angle is or not bounded by the integer bound B.

In a variant, if the internal precision $$\Delta I\phi = \frac{2\pi}{2^N},$$

the residual azimuthal angle is adaptively quantized by equation (10) with $\Delta\phi_{arc} = 2^N/x$ and $\alpha$ is set equal to x, then the threshold $Th_0$ is given by:

$$Th_0 = 2^N/(\alpha*\phi_{step}) \quad (20)$$

In one embodiment of step 130, the second data D2 is obtained by applying a monotonic function $m(\cdot)$ on the decoded radius race and said second data D2 is compared with a threshold TH obtained by applying a same monotonic function $m(\cdot)$ on the threshold $Th_0$:

$$\begin{cases} D2 = m(r_{dec}) \\ TH = m(Th_0) \end{cases}$$

In case the monotonic function $m(\cdot)$ is a monotonically increasing function, the scaled elementary azimuthal step $S(\phi_{step}, r_{dec})$ is equal to the elementary azimuthal step $\phi_{step}$ when the second data D2 is greater than or equal to the threshold TH, and is equal to the first data D1 when the second data D2 is strictly lower than the threshold TH.

Using a monotonic increasing or decreasing function is equivalent and the scope of the disclosure extends to monotonic increasing or decreasing functions $m(\cdot)$.

For example, in case the function $m(\cdot)$ is a monotonically decreasing function, one can construct an equivalent monotonically increasing function $m'(x)$ from $m(x)$, for instance as $m'(x) = -m(x)$, in order to keep using a monotonically increasing function.

As an other example, if the function $m(\cdot)$ is a monotonically decreasing function directly used, methods equivalent to the methods described in relation with Figures may be obviously obtained: For example, the scaled elementary azimuthal step $S(\phi_{step}, r_{dec})$ would be equal to the elementary azimuthal step $\phi_{step}$ when the second data D2 is strictly lower than the threshold TH, and would be equal to the first D1 when the second data D2 is greater than or equal to the threshold TH.

In a variant, the monotonic function $m(\cdot)$ is a scaling by the scaling factor $\alpha$ greater than or equal to one.

Then, the second data D2 and the threshold TH are given by $$\begin{cases} D2 = \alpha * r_{dec} \\ TH = \alpha * Th_0 \, Th0 = \alpha * \Delta\phi_{arc}/\phi_{step} \end{cases} \quad (21)$$

In a variant, if the internal precision $$\Delta I\phi = \frac{2\pi}{2^N},$$

the residual azimuthal angle is adaptively quantized by equation (10) with $\Delta\phi_{arc}=2^N/x$ and $\alpha$ is set equal to x, then, then the second data D2 and the threshold TH are given by $$\begin{cases} D2 = m(r_{dec}) = \alpha * r_{dec} \\ TH = m(Th_0) = \alpha * \dfrac{\Delta\phi_{arc}}{\phi_{step}} = 2^N/\phi_{step} \end{cases} \quad (22)$$

In a variant, the monotic function $m(\cdot)$ is being defined as the function providing the integer bound B in equation (15).

Then, the second data D2 and the threshold TH are given by:

$$\begin{cases} D2 = m(r_{dec}) = \text{round}\big(r_{dec} * \phi_{step}/(2 * \Delta\phi_{arc})\big) \\ TH = m(Th_0) = \text{round}\left(Th_0 * \dfrac{\phi_{step}}{2 * \Delta\phi_{arc}}\right) = 1 \end{cases} \quad (23)$$

In that variant, since the integer bound B (equation 15) is an integer, the condition B>0 is equivalent to D2>=TH (i.e. D2>=1), and the condition B=0 is equivalent to D2<1. When B=0 (D2<1) then the scaled elementary azimuthal step $S(\phi_{step}, r_{dec})$ equals the first data D1 (equations 16 or 17) greater than the elementary azimuthal step $\phi_{step}$, and the scaled elementary azimuthal step $S(\phi_{step}, r_{dec})$ equals the elementary azimuthal step $\phi_{step}$ otherwise.

If the integer bound B of equation (15) is used to bound the coding of residual azimuthal angle $\phi_{res}$, the variant using equation (23) is obviously preferred because the second data D2 equals the integer bound B, which is already computed for each points, and the threshold TH is always 1. Otherwise, when the integer bound B is not used for bounding the residual azimuthal angle, the first embodiment or one of its variant or equations 21 to 22 are preferred because the threshold TH need to be computed only once per point cloud, and the second data D2 in equation (23) needs to compute an integer division for each point of the point cloud.

When the second data D2 (the integer bound B) is given by equation (23), the integer division can be computed as a bitwise shift operation. For instance, if the internal precision of the codec for the fixed-point representation of azimuthal angles $$\Delta I\phi = \frac{2\pi}{2^N}$$

and $\Delta\phi_{arc}=2^N/8$, the integer bound B (D2) is given by:

$$D2=B=\text{round}(r_{dec}*\phi_{step}/(2*\Delta\phi_{arc}))=\text{round}(r_{dec}*\phi_{step}/ \\ (2^{N-3}))=(r_{dec}*\phi_{step}+(1<<(N-2)))>>(N-3) \quad (24)$$

where the result of (a)<<(b) is the bitwise left shift of (a) by (b) bits (i.e. the result of (a) multiplied by $2^b$), and the result of (a)>>(b) is the bitwise right shift of (a) by (b) bits (i.e. the result of the integer division of (a) by $2^b$).

Equation (16) involves an integer division for each point of the point cloud. This is something that it is preferable to avoid, as division is costly, in terms of hardware design, execution runtime and/or power consumption.

In preferred variants of previous embodiments, the division operation is approximated by less hardware costly operations.

There are lots of possibilities to approximate an integer division. For instance, the division u/v may be simply approximated by a right bitwise shift operation of u by a number of bit equal to the number of bits NV taken by v (i.e. NV=floor(log$_2$(v)+1)). In that case u/v is approximated by $u/2^{NV}$. Another method could be to use Newton-Raphson iterative algorithm (https://en.wikipedia.org/wiki/Division_algorithm) on a limited number of iterations. Or, as it is already used in G-PCC it is also possible to use a lookup table based approximation of 1/v with fixed point precision, and multiplying u by the approximated 1/v then rounding the fixed point result to the appropriate fixed foint (or integer) precision.

In comparison to a true integer division, small errors in the results may be introduced because of the approximation, thus equation (16) would become:

$$D1_{app}=\text{divApprox}(2^N,(r_{dec}*\alpha))=2^N/(r_{dec}*\alpha)+\varepsilon(r_{dec}) \quad (25)$$

where divApprox(u, v) is the approximation function of the integer division u/v, and $+\varepsilon(r_{dec})$ is the error introduced by the division approximation.

For example, divApprox($2^N$, $(r_{dec}*\alpha)$)=$2^{N-M}$ where M=floor(log$_2$($r_{dec}*\alpha$)+1) is the number of bits taken by $r_{dec}*\alpha$.

Because of the approximation error $\varepsilon(r_{dec})$, coding losses are introduced when using $D1_{app}$ in comparison to using D1 (equation 16).

Threes different cases may occur:

$D1_{app}$>D1, i.e. $\varepsilon(r_{dec})$>0

Then, because $D1_{app}$ it too high, the bitrate will be slightly reduced, because the number of scaled elementary azimuthal steps m, will be smaller, but more distortion on predicted ($x_{pred}$, $y_{pred}$) coordinates is introduced.

$D1_{app}$<D1, i.e. $\varepsilon(r_{dec})$<0

Then, because $D1_{app}$ is too small, the number of scaled elementary azimuthal steps $m_s$ may be a bit increased and so, the cost of its coding.

$D1_{app}$=D1 and so optimal efficiency is obtained.

In our experiments it is generally observed that the first case is more critical than the second case for a same absolute value of the error a($r_{dec}$) and so that it is preferable to increase a bit the bitrate rather than introducing prediction errors on ($x_{pred}$, $y_{pred}$) coordinates. Thus, it is preferred to avoid the first case.

In a variant of equation (16), the first data D1 (scaled elementary azimuthal step $S(\phi_{step}>r_{dec})$) obtained by equation (16) is refined by iteratively increasing it and/or optionally by iteratively decreasing it.

FIG. 2 illustrates an example of a method 300 of determining an approximation of a scaled elementary azimuthal step $S(\phi_{step}, r_{dec})$ in accordance with at least one embodiment.

In brief, the method refines iteratively a scaled elementary azimuthal step $S(\phi_{step}, r_{dec})$ using a few simple operations in each refinement step (bitwise shift operations, increment by one and comparison).

As explained before, when the decoded radius $r_{dec}$ (D2) is greater than or equal to the threshold TH, then a scaled elementary azimuthal step $S(\phi_{step}, r_{dec})$ is set equal to the elementary azimuthal step $\phi_{step}$. When the decoded radius $r_{dec}$ (D2) is strictly lower than the threshold TH (or when the integer bound B computed from the decoded radius $r_{dec}$ and from the elementary azimuthal step $\phi_{step}$ is equal to zero), in step 310, a first elementary azimuthal step $\phi_{step,0}$ is obtained from the approximation of $$\frac{2*\pi}{(r_{dec}*\alpha*\Delta I\phi)},$$

from the decoded radius $r_{dec}$, for instance:

$$\phi_{step,0} = \text{divApprox}(2^N, r_{dec}*\alpha)$$

In step 320, a first integer bound Bo value is obtained from the first elementary azimuthal step $\phi_{step,0}$ and the decoded radius $r_{dec}$ (equation 15).

Then, starting with index i=0, while the integer bound B; is greater than zero, index i is incremented by one (step 340), a new elementary azimuthal step $\phi_{step,i}$ is obtained (step 350) by decreasing by one a previous elementary azimuthal step $\phi_{step,i-1}$: $\phi_{step,i} = \phi_{step,i-1} - 1$, and a new integer bound B, is obtained (step 360) from the elementary azimuthal step $\phi_{step,i}$ and the decoded radius $r_{dec}$ (equation 15).

When the integer bound $B_i$ is equal to zero, the first case above is solved, and the scaled elementary azimuthal step $S(\phi_{step}, r_{dec})$ can be set equal to $\phi_{step,i}$.

Figure 10:
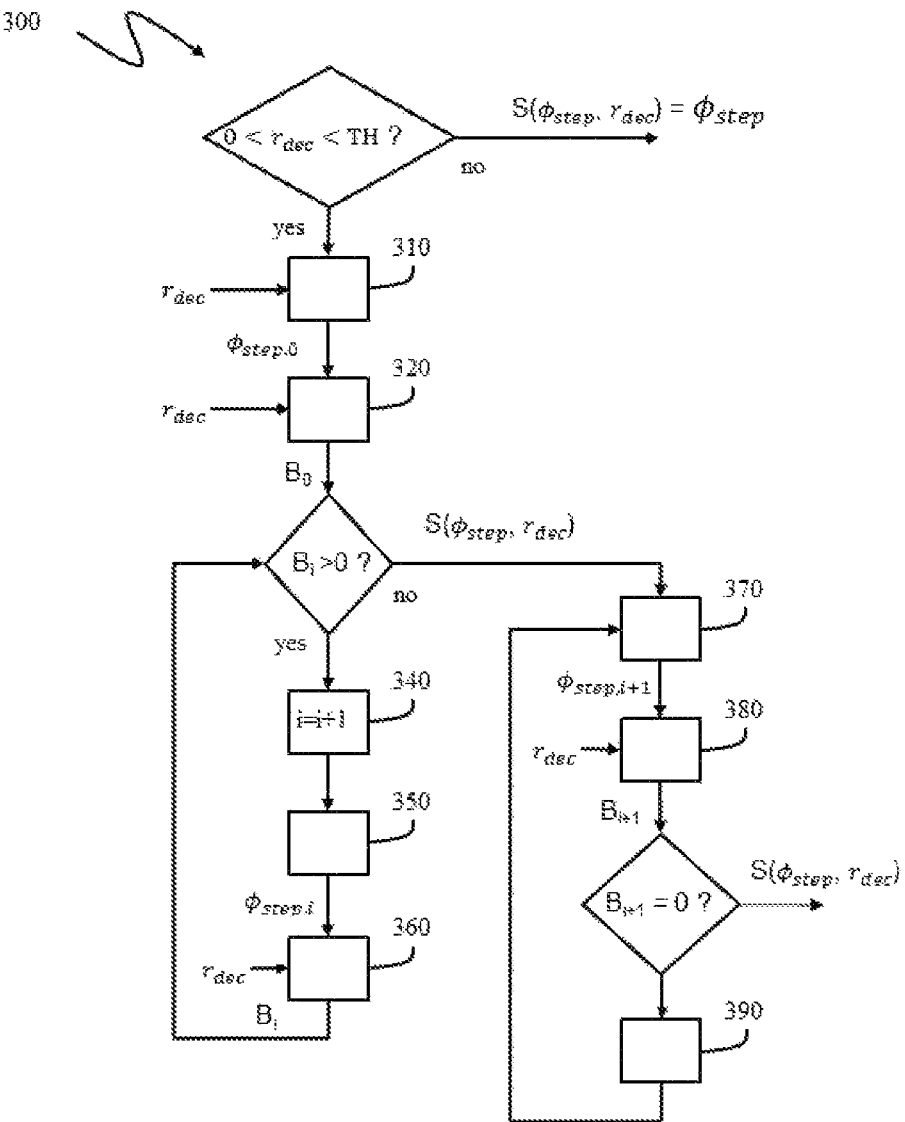
FIG. 10 illustrates an example of a method 300 of determining an approximation of a scaled elementary azimuthal step in accordance with at least one embodiment.

In variant, to also solve the second case above, as show in addition on FIG. 10, when the integer bound $B_i$ is equal to zero, a new elementary azimuthal step $\phi_{step,i+1}$ is obtained (step 370) by increasing by one the current elementary azimuthal step $\phi_{step,i}$: $\phi_{step,i+1} = \phi_{step,i} + 1$, and a new integer bound Bitt is obtained (step 380) from the elementary azimuthal step $\phi_{step,i+1}$ and the decoded radius $r_{dec}$ (equation 15).

If integer bound $B_{i+1}$ is equal to zero, it means $\phi_{step,i}$ can still be increased, to $\phi_{step,i+1}$ and so index i is incremented by one (step 390).

Then, a new elementary azimuthal step is obtained (step 370) and a new integer bound is obtained (step 380).

This is iteratively repeated until the integer bound $B_{i+1}$ is not equal to zero (i.e. it is greater than zero), and then the scaled elementary azimuthal step $S(\phi_{step}, r_{dec})$ is set equal to the current elementary azimuthal step $\phi_{step,i}$.

In variant, increase and/or decrease operation(s) may use a dynamically determined increment (and/or decrement) step.

For example, an increment value is doubled after each iteration of the method.

Figure 11:
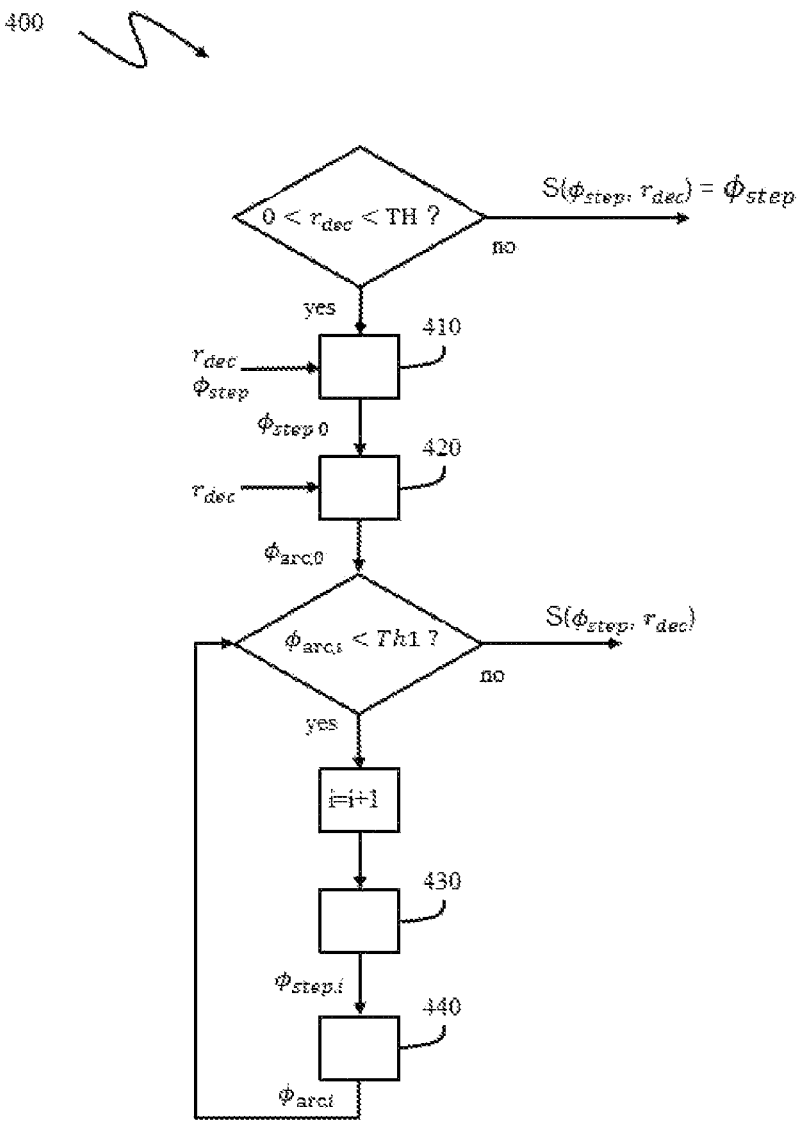
FIG. 11 illustrates an example of a method 400 of determining an approximation of a scaled elementary azimuthal step in accordance with at least one embodiment.

FIG. 11 illustrates another example of a method 400 of determining a scaled elementary azimuthal step $S(\phi_{step}, r_{dec})$ in accordance with at least one embodiment.

As explained before, when the decoded radius $r_{dec}$ (D2) is greater than or equal to the threshold TH, then a scaled elementary azimuthal step $S(\phi_{step}, r_{dec})$ is set equal to the elementary azimuthal step $\phi_{step}$. When the decoded radius $r_{dec}$ (D2) is strictly lower than the threshold TH (or when the integer bound B computed from the decoded radius $r_{dec}$ and the elementary azimuthal step $\phi_{step}$ is equal to zero), in step 410, a first elementary azimuthal step $\phi_{step,0}$ is set equal to the elementary azimuthal step $\phi_{step}$, and an associated arc length $\phi_{arc,0}$ is set equal to (step 420):

$$\phi_{arc,0} = \phi_{step,0}*r_{dec}*\alpha.$$

Then, starting with index i=0, while an arc length $\phi_{arc,i}$ is lower than a threshold $Th_1$, index i is incremented by 1, and previous elementary azimuthal step $\phi_{step,i-1}$ (step 430) and previous associated are length $\phi_{arc,i-1}$ (step 440) are multiplied by two (using left bitwise shift operations) to get new elementary azimuthal step $\phi_{step,i}$ and new associated arc length $\phi_{arc,i}$:

$$\begin{cases} \phi_{step,i} = \phi_{step,i-1} << 1 \\ \phi_{arc,i} = \phi_{arc,i-1} << 1 \end{cases}$$

When an arc length $\phi_{arc,i}$ is not anymore lower than the threshold $Th_1$, the scaled elementary azimuthal step $S(\phi_{step}, r_{dec})$ can be set equal to the elementary azimuthal step $\phi_{step,i}$.

Typically $Th_1 = \pi/\Delta I\phi$, and thus the method 400 for determining an approximation of a scaled elementary azimuthal step, is equivalent to finding the highest power of two $(2^n)$ factor of the elementary azimuthal step $\phi_{step}$ that is lower than $$\frac{2*\pi}{(r_{dec}*\alpha*\Delta I\phi)}$$

(i.e. satisfying $$\phi_{step}*2^n < 2*\frac{2*\pi}{(r_{dec}*\alpha*\Delta I\phi)}),$$

and using $\phi_{step}*2^n = \phi_{step} << n$ as scaled elementary azimuthal step $S(\phi_{step}, r_{dec})$. This, can be considered as a fast approximation of the division $$\frac{2*\pi}{(r_{dec}*\alpha*\Delta I\phi)}$$

(equation 16).

As an example, using the variant illustrated by FIG. 11, with $Th_1 = \pi/\Delta I\phi$ we are always in the second or third case explained above, ~90% of the coding gains that are obtained when using a true division were kept in our experiments. But if we use $Th_1 = \pi/\Delta I\phi$, but allow one more iteration when $\text{abs}(2*Th1 - 2*\phi_{arc,i}) < \text{abs}(2*Th1 | \phi_{arc,i})$, we allow first case but we reduce the absolute value of approximation error $\epsilon(r_{dec})$, only ~72% of the coding gains were kept, even if the error made on the division is smaller or equal to previously. This illustrates that it is preferable to avoid the third case.

The present encoding/decoding method can be used to encode/decode the point cloud which may be used for various purposes, especially relate to encoding/decoding the point cloud data based on the dynamically list scaled azimuthal angle step, which improves the compression performance of the point cloud.

Figure 12:
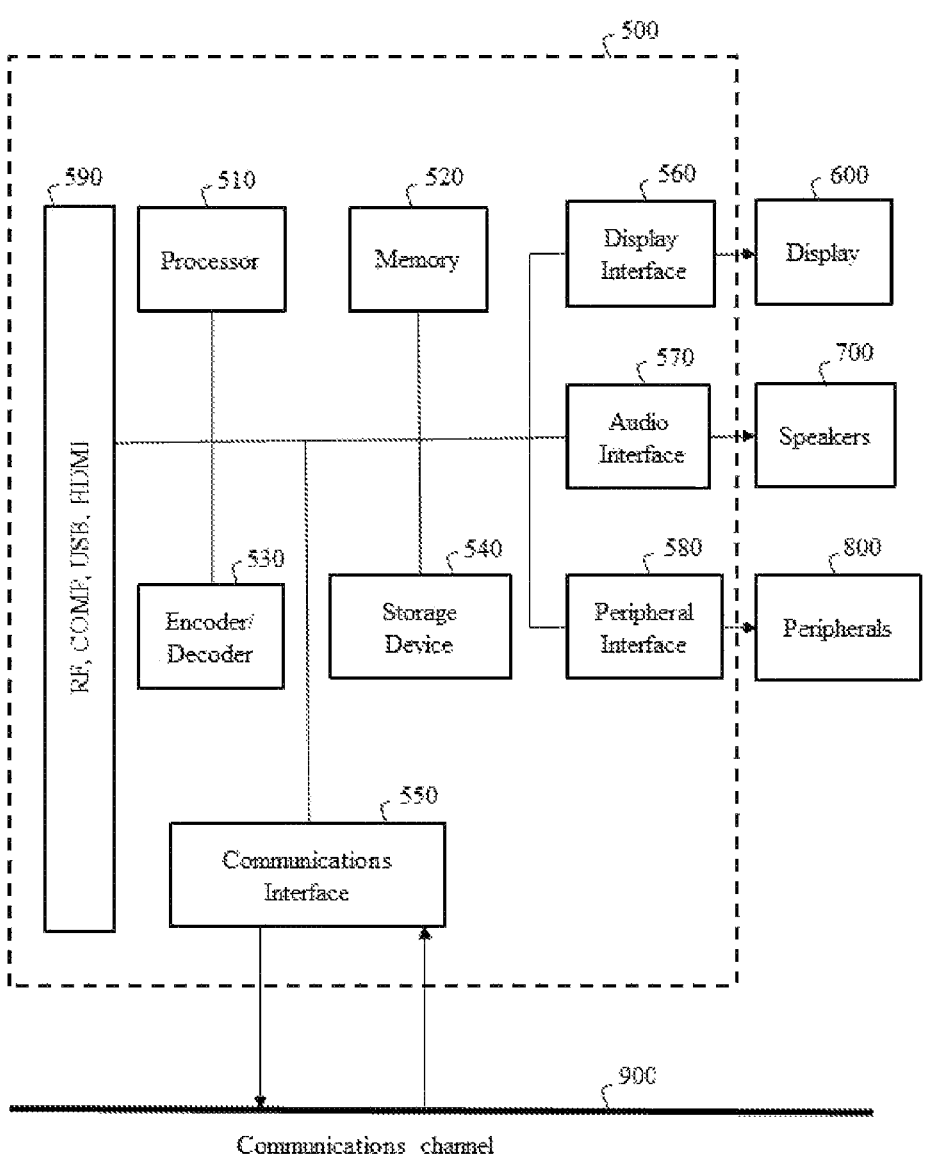
FIG. 12 illustrates a schematic block diagram of an example of a system in which various aspects and embodiments are implemented.

FIG. 12 shows a schematic block diagram illustrating an example of a system in which various aspects and embodiments are implemented.

System 500 may be embedded as one or more devices including the various components described below. In various embodiments, the system 500 may be configured to implement one or more of the aspects described in the disclosure.

Examples of equipment that may form all or part of the system 500 include personal computers, laptops, smartphones, tablet computers, digital multimedia set top boxes, digital television receivers, personal video recording systems, connected home appliances, connected vehicles and their associated processing systems, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing a point cloud, a video or an image or other communication devices. Elements of system 500, singly or in combination, may be embodied in a single integrated circuit (IC), multiple ICs, and/or discrete components. For example, in at least one embodiment, the processing and encoder/decoder elements of system 500 may be distributed across multiple ICs and/or discrete components. In various embodiments, the system 500 may be communicatively coupled to other similar systems, or to other electronic devices, via, for example, a communications bus or through dedicated input and/or output ports.

The system 500 may include at least one processor 510 configured to execute instructions loaded therein for implementing, for example, the various aspects described in the disclosure. Processor 510 may include embedded memory, input output interface, and various other circuitries as known in the art. The system 500 may include at least one memory 520 (for example a volatile memory device and/or a non-volatile memory device). System 500 may include a storage device 540, which may include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random-Access Memory (DRAM), Static Random-Access Memory (SRAM), flash, magnetic disk drive, and/or optical disk drive. The storage device 540 may include an internal storage device, an attached storage device, and/or a network accessible storage device, as non-limiting examples.

The system 500 may include an encoder/decoder module 530 configured, for example, to process data to provide encoded/decoded point cloud geometry data, and the encoder/decoder module 530 may include its own processor and memory. The encoder/decoder module 530 may represent module(s) that may be included in a device to perform the encoding and/or decoding functions. As is known, a device may include one or both of the encoding and decoding modules. Additionally, encoder/decoder module 530 may be implemented as a separate element of system 500 or may be incorporated within processor 510 as a combination of hardware and software as known to those skilled in the art.

Program code to be loaded onto processor 510 or encoder/decoder 530 to perform the various aspects described in the disclosure may be stored in storage device 540 and subsequently loaded onto memory 520 for execution by processor 510. In accordance with various embodiments, one or more of processor 510, memory 520, storage device 540, and encoder/decoder module 530 may store one or more of various items during the performance of the processes described in the disclosure. Such stored items may include, but are not limited to, a point cloud frame, encoded/decoded geometry/attributes videos/images or portions of the encoded/decoded geometry/attribute video/images, a bitstream, matrices, variables, and intermediate or final results from the processing of equations, formulas, operations, and operational logic.

In several embodiments, memory inside of the processor 510 and/or the encoder/decoder module 530 may be used to store instructions and to provide working memory for processing that may be performed during encoding or decoding.

In other embodiments, however, a memory external to the processing device (for example, the processing device may be either the processor 510 or the encoder/decoder module 530) may be used for one or more of these functions. The external memory may be the memory 520 and/or the storage device 540, for example, a dynamic volatile memory and/or a non-volatile flash memory. In several embodiments, an external non-volatile flash memory may be used to store the operating system of a television. In at least one embodiment, a fast external dynamic volatile memory such as a RAM may be used as working memory for video coding and decoding operations, such as for MPEG-2 part 2 (also known as ITU-T Recommendation H.262 and ISO/IEC 13818-2, also known as MPEG-2 Video), HEVC (High Efficiency Video coding), VVC (Versatile Video Coding), or MPEG-I part 5 or part 9.

The input to the elements of system 500 may be provided through various input devices as indicated in block 590. Such input devices include, but are not limited to, (i) an RF portion that may receive an RF signal transmitted, for example, over the air by a broadcaster, (ii) a Composite input terminal, (iii) a USB input terminal, and/or (iv) an HDMI input terminal.

In various embodiments, the input devices of block 590 may have associated respective input processing elements as known in the art. For example, the RF portion may be associated with elements necessary for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which may be referred to as a channel in certain embodiments, (iv) demodulating the down-converted and band-limited signal, (v) performing error correction, and (vi) demultiplexing to select the desired stream of data packets. The RF portion of various embodiments may include one or more elements to perform these functions, for example, frequency selectors, signal selectors, band-limiters, channel selectors, filters, downconverters, demodulators, error correctors, and de-multiplexers. The RF portion may include a tuner that performs various of these functions, including, for example, down-converting the received signal to a lower frequency (for example, an intermediate frequency or a near-baseband frequency) or to baseband.

In one set-top box embodiment, the RF portion and its associated input processing element may receive an RF signal transmitted over a wired (for example, cable) medium. Then, the RF portion may perform frequency selection by filtering, down-converting, and filtering again to a desired frequency band.

Various embodiments rearrange the order of the above-described (and other) elements, remove some of these elements, and/or add other elements performing similar or different functions.

Adding elements may include inserting elements in between existing elements, such as, for example, inserting amplifiers and an analog-to-digital converter. In various embodiments, the RF portion may include an antenna.

Additionally, the USB and/or HDMI terminals may include respective interface processors for connecting system 500 to other electronic devices across USB and/or HDMI connections. It is to be understood that various aspects of input processing, for example, Reed-Solomon error correction, may be implemented, for example, within a separate input processing IC or within processor 510 as necessary. Similarly, aspects of USB or HDMI interface processing may be implemented within separate interface ICs or within processor 510 as necessary. The demodulated, error corrected, and demultiplexed stream may be provided to various processing elements, including, for example, processor 510, and encoder/decoder 530 operating in combination with the memory and storage elements to process the data stream as necessary for presentation on an output device.

Various elements of system 500 may be provided within an integrated housing. Within the integrated housing, the various elements may be interconnected and transmit data therebetween using suitable connection arrangement 590, for example, an internal bus as known in the art, including the I2C bus, wiring, and printed circuit boards.

The system 500 may include communication interface 550 that enables communication with other devices via communication channel 900. The communication interface 550 may include, but is not limited to, a transceiver configured to transmit and to receive data over communication channel 900. The communication interface 550 may include, but is not limited to, a modem or network card and the communication channel 900 may be implemented, for example, within a wired and/or a wireless medium.

Data may be streamed to the system 500, in various embodiments, using a Wi-Fi network such as IEEE 802.11. The Wi-Fi signal of these embodiments may be received over the communications channel 900 and the communications interface 550 which are adapted for Wi-Fi communications. The communications channel 900 of these embodiments may be typically connected to an access point or router that provides access to outside networks including the Internet for allowing streaming applications and other over-the-top communications.

Other embodiments may provide streamed data to the system 500 using a set-top box that delivers the data over the HDMI connection of the input block 590.

Still other embodiments may provide streamed data to the system 500 using the RF connection of the input block 590.

The streamed data may be used as a way for signaling information used by the system 500. The signaling information may comprise the bitstream B and/or information such a number of points of a point cloud and/or sensor setup parameters such as an elementary azimuthal step $\phi_{step}$ or an elevation angle $\theta_k$ associated with a sensor of the spinning sensor head 10.

It is to be appreciated that signaling may be accomplished in a variety of ways. For example, one or more syntax elements, flags, and so forth may be used to signal information to a corresponding decoder in various embodiments.

The system 500 may provide an output signal to various output devices, including a display 500, speakers 700, and other peripheral devices 800. The other peripheral devices 800 may include, in various examples of embodiments, one or more of a stand-alone DVR, a disk player, a stereo system, a lighting system, and other devices that provide a function based on the output of the system 500.

In various embodiments, control signals may be communicated between the system 500 and the display 600, speakers 700, or other peripheral devices 800 using signaling such as AV.Link (Audio/Video Link), CEC (Consumer Electronics Control), or other communications protocols that enable device-to-device control with or without user intervention.

The output devices may be communicatively coupled to system 500 via dedicated connections through respective interfaces 560, 570, and 580.

Alternatively, the output devices may be connected to system 500 using the communications channel 900 via the communications interface 550. The display 600 and speakers 700 may be integrated in a single unit with the other components of system 500 in an electronic device such as, for example, a television.

In various embodiments, the display interface 560 may include a display driver, such as, for example, a timing controller (T Con) chip.

The display 600 and speaker 700 may alternatively be separate from one or more of the other components, for example, if the RF portion of input 590 is part of a separate set-top box. In various embodiments in which the display 600 and speakers 700 may be external components, the output signal may be provided via dedicated output connections, including, for example, HDMI ports, USB ports, or COMP outputs.

In FIG. 1-12, various methods are described herein, and each of the methods includes one or more steps or actions for achieving the described method. Unless a specific order of steps or actions is required for proper operation of the method, the order and/or use of specific steps and/or actions may be modified or combined.

Some examples are described with regard to block diagrams and/or operational flowcharts. Each block represents a circuit element, module, or portion of code which includes one or more executable instructions for implementing the specified logical function(s). It should also be noted that in other implementations, the function(s) noted in the blocks may occur out of the indicated order. For example, two blocks shown in succession may, in fact, be executed substantially concurrently or the blocks may sometimes be executed in the reverse order, depending on the functionality involved.

The implementations and aspects described herein may be implemented in, for example, a method or a process, an apparatus, a computer program, a data stream, a bitstream, or a signal. Even if only discussed in the context of a single form of implementation (for example, discussed only as a method), the implementation of features discussed may also be implemented in other forms (for example, an apparatus or computer program).

The methods may be implemented in, for example, a processor, which refers to processing devices in general, including, for example, a computer, a microprocessor, an integrated circuit, or a programmable logic device. Processors also include communication devices.

Additionally, the methods may be implemented by instructions being performed by a processor, and such instructions (and/or data values produced by an implementation) may be stored on a computer readable storage medium. A computer readable storage medium may take the form of a computer readable program product embodied in one or more computer readable medium(s) and having computer readable program code embodied thereon that is executable by a computer. A computer readable storage medium as used herein may be considered a non-transitory storage medium given the inherent capability to store the information therein as well as the inherent capability to provide retrieval of the information therefrom. A computer readable storage medium may be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the embodiments may be applied, is merely an illustrative and not an exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

An apparatus may be implemented in, for example, appropriate hardware, software, and firmware. Examples of such apparatus include personal computers, laptops, smartphones, tablet computers, digital multimedia set top boxes, digital television receivers, personal video recording systems, connected home appliances, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing a point cloud, a video or an image or other communication devices. As should be clear, the equipment may be mobile and even installed in a mobile vehicle.

Computer software may be implemented by the processor 510 or by hardware, or by a combination of hardware and software. As a non-limiting example, the embodiments may be also implemented by one or more integrated circuits. The memory 520 may be of any type appropriate to the technical environment and may be implemented using any appropriate data storage technology, such as optical memory devices, magnetic memory devices, semiconductor-based memory devices, fixed memory, and removable memory, as non-limiting examples. The processor 510 may be of any type appropriate to the technical environment, and may encompass one or more of microprocessors, general purpose computers, special purpose computers, and processors based on a multi-core architecture, as non-limiting examples.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The terminology used herein is for the purpose of describing particular embodiments only and is not intended to be limiting. As used herein, the singular forms "a", "an", and "the" may be intended to include the plural forms as well, unless the context clearly indicates otherwise. It will be further understood that the terms "includes/comprises" and/ or "including/comprising" when used in this specification, may specify the presence of stated, for example, features, integers, steps, operations, elements, and/or components but do not preclude the presence or addition of one or more other features, integers, steps, operations, elements, components, and/or groups thereof. Moreover, when an element is referred to as being "responsive" or "connected" to another element, it may be directly responsive or connected to the other element, or intervening elements may be present. In contrast, when an element is referred to as being "directly responsive" or "directly connected" to other element, there are no intervening elements present.

It is to be appreciated that the use of any of the symbol/ term "/", "and/or", and "at least one of", for example, in the cases of "A/B", "A and/or B" and "at least one of A and B", may be intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Various numeric values may be used in the disclosure. The specific values may be for example purposes and the aspects described are not limited to these specific values.

It will be understood that, although the terms first, second, etc. may be used herein to describe various elements, these elements are not limited by these terms. These terms are only used to distinguish one element from another. For example, a first element could be termed a second element, and, similarly, a second element could be termed a first element without departing from the teachings of this disclosure. No ordering is implied between a first element and a second element.

Reference to "one embodiment" or "an embodiment" or "one implementation" or "an implementation", as well as other variations thereof, is frequently used to convey that a particular feature, structure, characteristic, and so forth (described in connection with the embodiment/implementation) is included in at least one embodiment/implementation. Thus, the appearances of the phrase "in one embodiment" or "in an embodiment" or "in one implementation" or "in an implementation", as well any other variations, appearing in various places throughout this disclosure are not necessarily all referring to the same embodiment.

Similarly, reference herein to "in accordance with an embodiment/example/implementation" or "in an embodiment/example/implementation", as well as other variations thereof, is frequently used to convey that a particular feature, structure, or characteristic (described in connection with the embodiment/example/implementation) may be included in at least one embodiment/example/implementation. Thus, the appearances of the expression "in accordance with an embodiment/example/implementation" or "in an embodiment/example/implementation" in various places in the specification are not necessarily all referring to the same embodiment/example/implementation, nor are separate or alternative embodiment/examples/implementation necessarily mutually exclusive of other embodiments/examples/implementation.

Reference numerals appearing in the claims are by way of illustration only and shall have no limiting effect on the scope of the claims. Although not explicitly described, the embodiments/examples and variants may be employed in any combination or sub-combination.

When a figure, is presented as a flow diagram, it should be understood that it also provides a block diagram of a corresponding apparatus. Similarly, when a figure is presented as a block diagram, it should be understood that it also provides a flow diagram of a corresponding method/process.

Although some of the diagrams include arrows on communication paths to show a primary direction of communication, it is to be understood that communication may occur in the opposite direction to the depicted arrows.

Various implementations involve decoding. "Decoding", as used in this disclosure, may encompass all or part of the processes performed, for example, on a received point cloud frame (including possibly a received bitstream which encodes one or more point cloud frames) in order to produce a final output suitable for display or for further processing in the reconstructed point cloud domain. In various embodiments, such processes include one or more of the processes typically performed by a decoder. In various embodiments, such processes also, or alternatively, include processes performed by a decoder of various implementations described in this disclosure, for example, As further examples, in one embodiment "decoding" may refer to entropy decoding, in another embodiment "decoding" may refer only to differential decoding, and in another embodiment "decoding" may refer to combinations of entropy decoding and differential decoding. Whether the phrase "decoding process" may be intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this disclosure may encompass all or part of the processes performed, for example, on an input point cloud frame in order to produce an encoded bitstream. In various embodiments, such processes include one or more of the processes typically performed by an encoder. In various embodiments, such processes also, or alternatively, include processes performed by an encoder of various implementations described in this disclosure.

As further examples, in one embodiment "encoding" may refer only to entropy encoding, in another embodiment "encoding" may refer only to differential encoding, and in another embodiment "encoding" may refer to combinations of differential encoding and entropy encoding. Whether the phrase "encoding process" may be intended to refer specifically to a subset of operations or generally to the broader encoding process will be clear based on the context of the specific descriptions and is believed to be well understood by those skilled in the art.

Additionally, this disclosure may refer to "determining" various pieces of information. Determining the information may include one or more of, for example, estimating the information, calculating the information, predicting the information, or retrieving the information from memory.

Further, this disclosure may refer to "accessing" various pieces of information. Accessing the information may include one or more of, for example, receiving the information, retrieving the information (for example, from memory or bitstream), storing the information, moving the information, copying the information, calculating the information, determining the information, predicting the information, or estimating the information.

Additionally, this disclosure may refer to "receiving" various pieces of information. Receiving is, as with "accessing", intended to be a broad term. Receiving the information may include one or more of, for example, accessing the information, or retrieving the information (for example, from memory or bitstream). Further, "receiving" is typically involved, in one way or another, during operations such as, for example, storing the information, processing the information, transmitting the information, moving the information, copying the information, erasing the information, calculating the information, determining the information, predicting the information, or estimating the information.

Also, as used herein, the word "signal" refers to, among other things, indicating something to a corresponding decoder. For example, in certain embodiments the encoder signals a particular information such a number of points of the point cloud or sensor setup parameters such as the elementary azimuthal step $\phi_{step}$ or an elevation angle $\theta_k$ associated with a sensor k. In this way, in an embodiment the same parameter may be used at both the encoder side and the decoder side. Thus, for example, an encoder may transmit (explicit signaling) a particular parameter to the decoder so that the decoder may use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various embodiments. It is to be appreciated that signaling may be accomplished in a variety of ways. For example, one or more syntax elements, flags, and so forth are used to signal information to a corresponding decoder in various embodiments. While the preceding relates to the verb form of the word "signal", the word "signal" may also be used herein as a noun.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this disclosure.

The invention claimed is:

1. A method of encoding a point cloud into a bitstream of encoded point cloud data representing a physical object, each point of the point cloud being associated with spherical coordinates representing an azimuthal angle responsive to a capture angle of a sensor of a spinning sensor head that captured the point and a radius responsive of a distance of the point from a referential, the method comprising:

obtaining a scaled elementary azimuthal step ($S(\phi_{step}, r_{dec})$) associated with a point of the point cloud, the scaled elementary azimuthal step ($S(\phi_{step}, r_{dec})$) being equal to first data (D1) greater than an elementary azimuthal step ($\phi_{step}$) in response to second data (D2) being strictly lower than a threshold, and the scaled elementary azimuthal step ($S(\phi_{step}, r_{dec})$) being equal to the elementary azimuthal step ($\phi_{step}$) in response to the second data (D2) being equal to or greater than the threshold, the elementary azimuthal step ($\phi_{step}$) being derived from frequencies and rotation speed at which a spinning sensor head captured the point cloud, and the second data (D2) depending on a decoded radius ($r_{dec}$) of the point obtained by encoding and decoding a radius associated with the point;

encoding, in the bitstream, a number ($m_s$) of scaled elementary azimuthal steps obtained from an azimuthal angle of the point, a prediction of the azimuthal angle and the scaled elementary azimuthal step; and encoding, in the bitstream, an residual azimuthal angle of the point between the azimuthal angle of the point and a predicted azimuthal angle derived from the number ($m_s$) of scaled elementary azimuthal steps and the scaled elementary azimuthal step ($S(\phi_{step}, r_{dec})$).

2. A method of decoding a point cloud from a bitstream of encoded point cloud data representing a physical object, each point of the point cloud being associated with spherical coordinates representing an azimuthal angle responsive to a capture angle of a sensor of a spinning sensor head that captured the point and a radius responsive of a distance of the point from a referential, the method comprising:

decoding an elementary azimuthal step ($\phi_{step}$) from the bitstream;

obtaining a decoded radius ($r_{dec}$) of a point of the point cloud from a decoded residual radius ($r_{res,dec}$) decoded from the bitstream;

obtaining a scaled elementary azimuthal step ($S(\phi_{step}, r_{dec})$) associated with a point of the point cloud, the scaled elementary azimuthal step ($S(\phi_{step}, r_{dec})$) being equal to first data (D1) greater than the elementary azimuthal step ($\phi_{step}$) in response to second data (D2), depending on the decoded radius ($r_{dec}$) of the point, being strictly lower than a threshold (TH), and the scaled elementary azimuthal step ($S(\phi_{step}, r_{dec})$) being equal to the elementary azimuthal step ($\phi_{step}$) in response to the second data (D2), depending on the decoded radius ($r_{dec}$) of the point, being equal to or greater than the threshold (TH);

decoding a number ($m_s$) of scaled elementary azimuthal steps from the bitstream;

decoding a decoded residual azimuthal angle ($\phi_{res,dec}$) from the bitstream; and obtaining a decoded azimuthal angle ($\phi_{dec}$) from the decoded residual azimuthal angle ($\phi_{res,dec}$) and a predicted azimuthal angle derived from the number ($m_s$) of scaled elementary azimuthal steps and the scaled elementary azimuthal step ($S(\phi_{step}, r_{dec})$).

3. The method of claim 1, wherein the first data (D1) depends on the decoded radius ($r_{dec}$).

4. The method of claim 3, wherein the first data (D1) is inversely proportional to a product of the decoded radius and a scaling factor ($\alpha$) greater than or equal to 1.

5. The method of claim 1, wherein the second data (D2) is the decoded radius ($r_{dec}$).

6. The method of claim 1, wherein the second data (D2) is obtained by applying a monotonic function on the decoded radius ($r_{dec}$) and the second data (D2) is compared with a second threshold (TH) obtained by applying a same monotonic function on the threshold.

7. The method of claim 6, wherein the monotonic function is defined as a function providing an integer bound of the residual azimuthal angle.

8. The method of one claim 6, wherein the first data (D1) is obtained from an approximation of $2\pi/(r_{dec}*\alpha*\Delta I\phi)$ where $r_{dec}$ is the decoded radius, $\alpha$ is a scaling factor greater than or equal to 1, and $\Delta I\phi$ corresponds to an internal precision for the azimuthal angles.

9. The method of claim 8, wherein the first data (D1) is obtained by refining iteratively the approximation.

10. The method of claim 8, wherein the approximation is obtained by finding a highest power of two factor of an elementary azimuthal step that is lower than $2\pi/(r_{dec}*\alpha*\Delta I\phi)$.

11. An apparatus of encoding a point cloud into a bitstream of encoded point cloud data representing a physical object, each point of the point cloud being associated with spherical coordinates representing an azimuthal angle responsive to a capture angle of a sensor of a spinning sensor head that captured the point and a radius responsive of a distance of the point from a referential, the apparatus comprising one or more processors configured to:

obtain a scaled elementary azimuthal step associated with a point of the point cloud, the scaled elementary azimuthal step being equal to first data greater than an elementary azimuthal step in response to second data is strictly lower than a threshold, and the scaled elementary azimuthal step being equal to the elementary azimuthal step in response to the second data being equal to or greater than the threshold, the elementary azimuthal step being derived from frequencies and rotation speed at which a spinning sensor head captured the point cloud, and the second data depending on a decoded radius of the point obtained by encoding and decoding a radius associated with the point;

encode, in the bitstream, a number of scaled elementary azimuthal steps obtained from an azimuthal angle of the point, a prediction of the azimuthal angle and the scaled elementary azimuthal step; and encode, in the bitstream, an residual azimuthal angle of the point between the azimuthal angle of the point and a predicted azimuthal angle derived from the number of scaled elementary azimuthal steps and the scaled elementary azimuthal step.

12. An apparatus of decoding a point cloud from a bitstream of encoded point cloud data representing a physical object, each point of the point cloud being associated with spherical coordinates representing an azimuthal angle responsive to a capture angle of a sensor of a spinning sensor head that captured the point and a radius responsive of a distance of the point from a referential, the apparatus comprising one or more processors configured to perform the method of claim 2.

13. A non-transitory computer-readable storage medium carrying instructions of program code for executing the method of claim 2.

14. The method of claim 2, wherein the first data (D1) depends on the decoded radius ($r_{dec}$).

15. The method of claim 14, wherein the first data (D1) is inversely proportional to a product of the decoded radius and a scaling factor ($\alpha$) greater than or equal to 1.

16. The method of claim 2, wherein the second data (D2) is the decoded radius ($r_{dec}$).

17. The method of claim 2, wherein the second data (D2) is obtained by applying a monotonic function on the decoded radius ($r_{dec}$) and the second data (D2) is compared with a second threshold (TH) obtained by applying a same monotonic function on the threshold.

18. The method of claim 17, wherein the monotonic function is defined as a function providing an integer bound of the residual azimuthal angle.

19. The method of claim 17, wherein the first data (D1) is obtained from an approximation of $2\pi/(r_{dec}*\alpha*\Delta I\phi)$ where $r_{dec}$ is the decoded radius, a is a scaling factor greater than or equal to 1, and $\Delta I\phi$ corresponds to an internal precision for the azimuthal angles;

wherein the first data (D1) is obtained by refining iteratively the approximation;

wherein the approximation is obtained by finding a highest power of two factor of an elementary azimuthal step that is lower than $2\pi/(r_{dec}*\alpha*\Delta I\phi)$.

20. A non-transitory computer-readable storage medium carrying instructions of program code for executing the method of claim 1.

\* \* \* \* \*